United States Patent
Nakamura et al.

(10) Patent No.: US 6,891,328 B2
(45) Date of Patent: *May 10, 2005

(54) LIGHT SOURCE FOR IMAGE READING APPARATUS AND IMAGE READING APPARATUS

(75) Inventors: Tetsuroh Nakamura, Takaraduka (JP); Masaichiro Tatekawa, Minoo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/078,498

(22) Filed: Feb. 21, 2002

(65) Prior Publication Data

US 2002/0113550 A1 Aug. 22, 2002

(30) Foreign Application Priority Data

Feb. 22, 2001 (JP) .......................... 2001-046627
Feb. 22, 2001 (JP) .......................... 2001-046628
Mar. 29, 2001 (JP) .......................... 2001-095377

(51) Int. Cl.[7] .................. H01J 1/62; H01J 63/04; G03G 15/04; G03G 15/00
(52) U.S. Cl. .................. 313/506; 313/500; 313/504; 313/505; 313/511; 313/512; 399/4; 399/220
(58) Field of Search .................. 313/500, 505, 313/506, 509, 498; 399/218, 220

(56) References Cited

U.S. PATENT DOCUMENTS

| | | | |
|---|---|---|---|
| 5,483,120 A | * | 1/1996 | Murakami .................. 313/506 |
| 6,366,025 B1 | * | 4/2002 | Yamada .................. 315/169.3 |
| 6,396,218 B1 | * | 5/2002 | Proctor .................. 315/169.3 |
| 6,541,130 B2 | * | 4/2003 | Fukuda .................. 428/690 |
| 6,617,785 B2 | * | 9/2003 | Shibata et al. .............. 313/506 |
| 6,624,569 B1 | * | 9/2003 | Pennaz et al. .............. 313/505 |
| 6,624,570 B1 | * | 9/2003 | Sano et al. .................. 313/506 |

FOREIGN PATENT DOCUMENTS

| | | | | |
|---|---|---|---|---|
| JP | 05315073 A | * | 11/1993 | ........... H05B/33/06 |
| JP | 2036620060 | | 8/2000 | |
| JP | 2036620061 | | 8/2000 | |

* cited by examiner

Primary Examiner—Joseph Williams
Assistant Examiner—Matt Hodges
(74) Attorney, Agent, or Firm—McDermott Will & Emery LLP

(57) ABSTRACT

A light source using electroluminescence layers of which width and thickness are adjusted so that emission luminance does not depend on the position on the layer. Also, a light source using red, green and blue electroluminescences light media for a color source of which the width and thickness are so adjusted that the required emission luminance can be obtained from electroluminescences for the respective colors. In light sources using electroluminescence not adjusted in width and thickness as light medium, emission luminance is different from position to position, especially in the direction along the longitudinal direction.

34 Claims, 34 Drawing Sheets

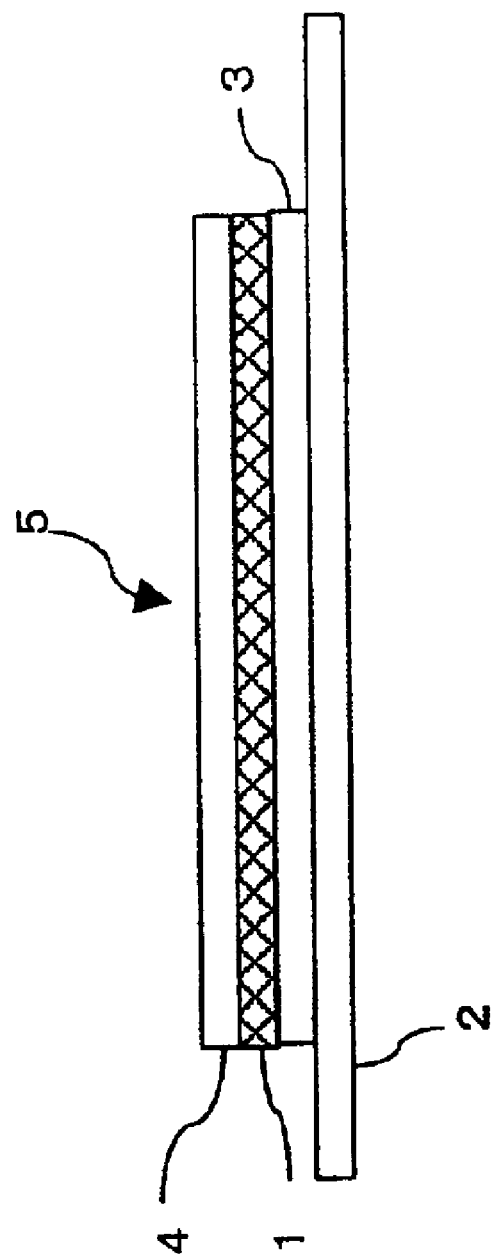

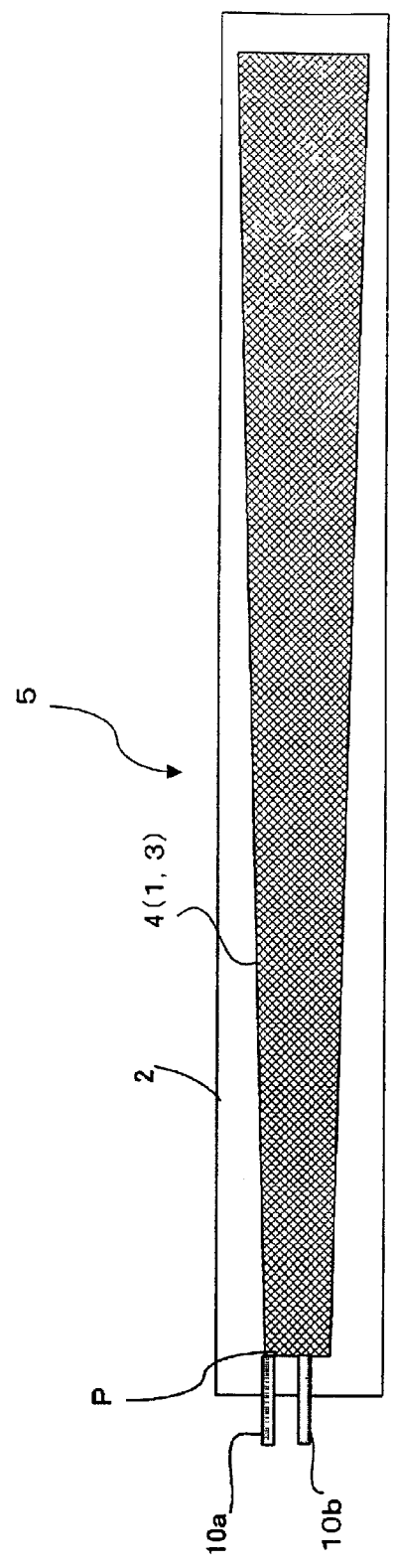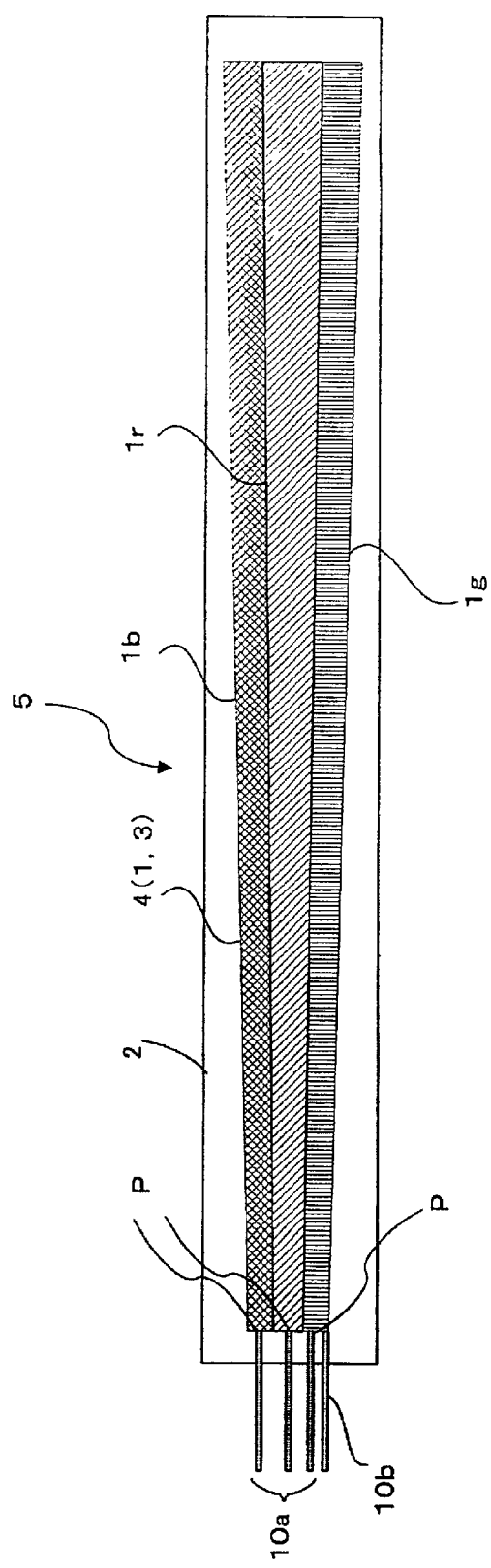

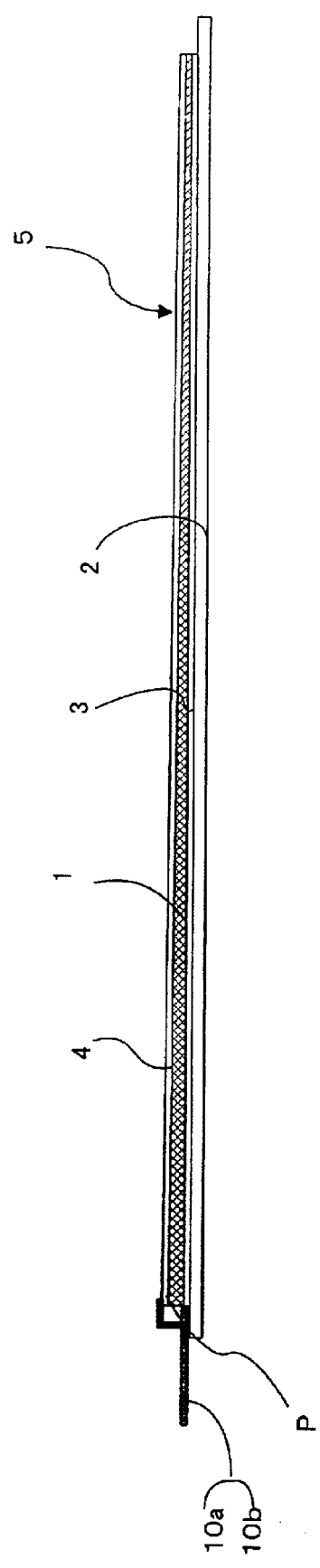
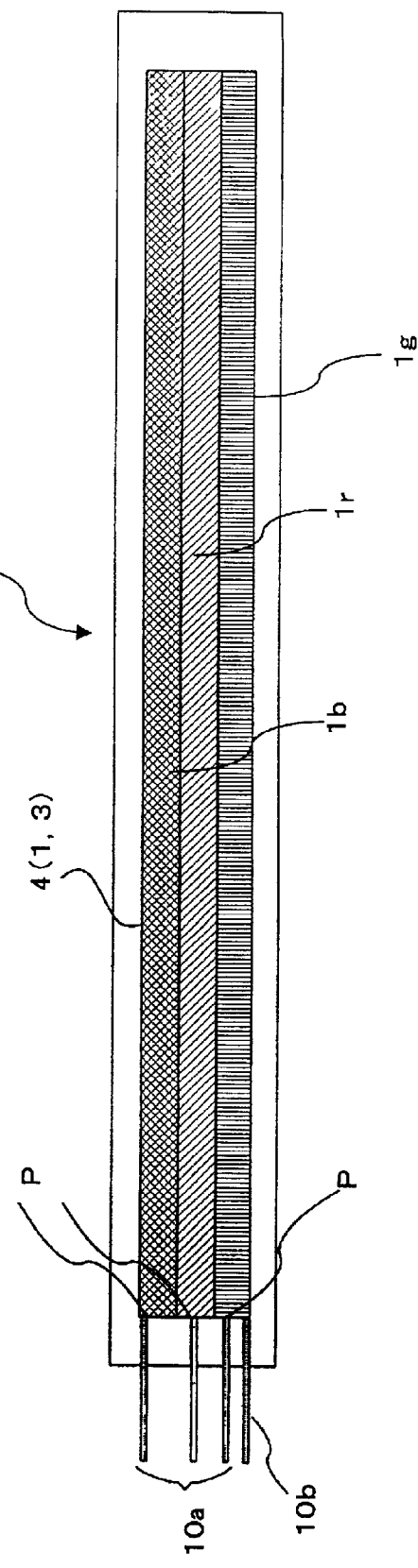

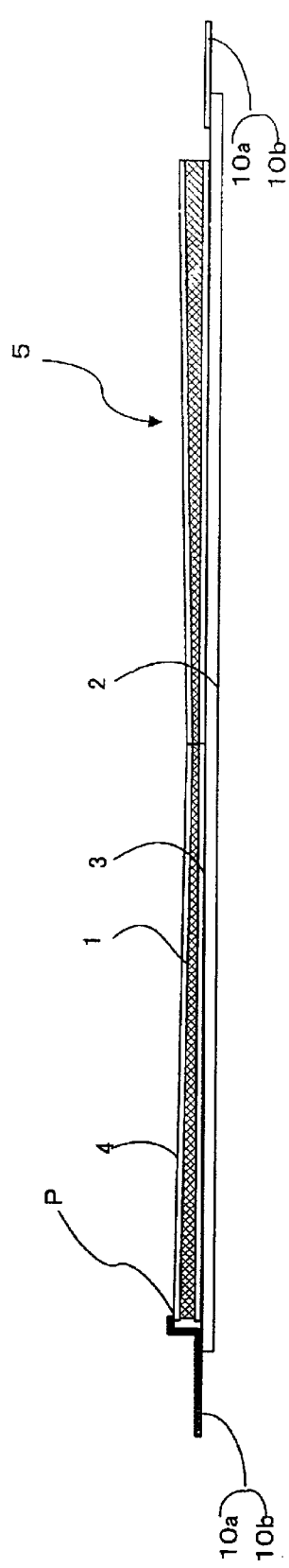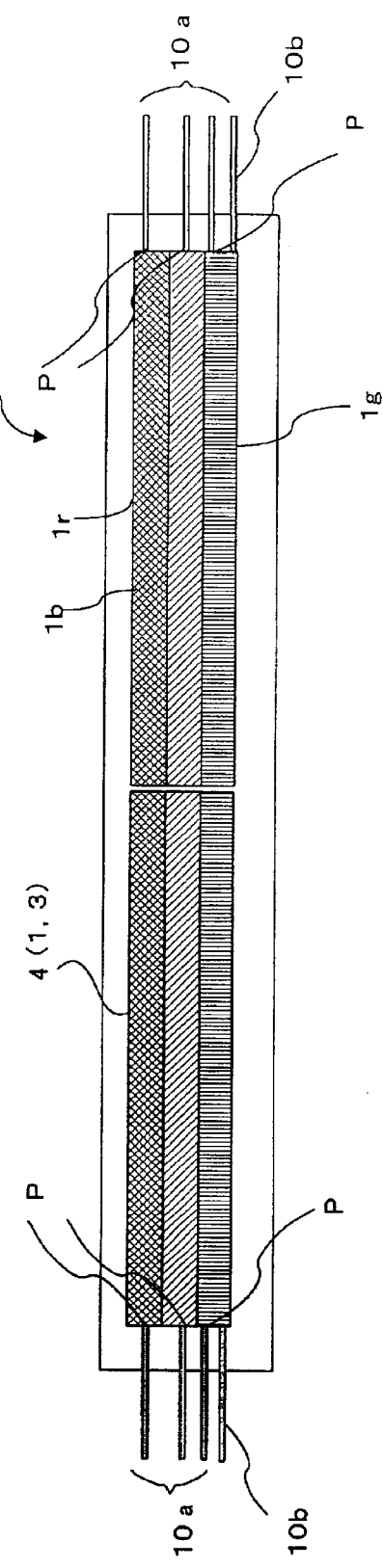

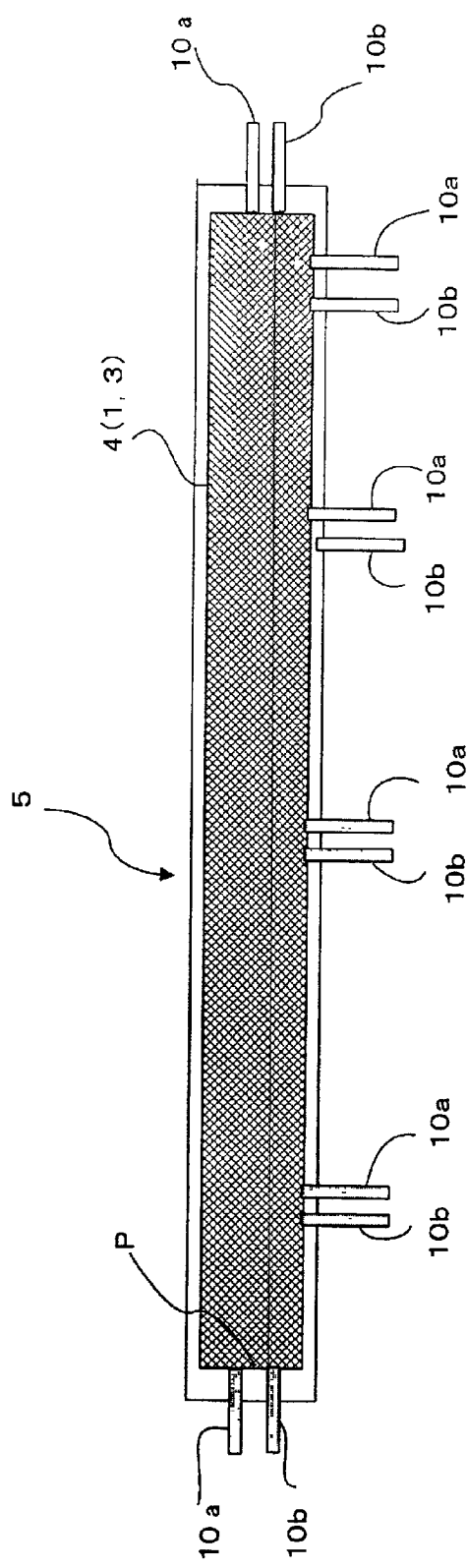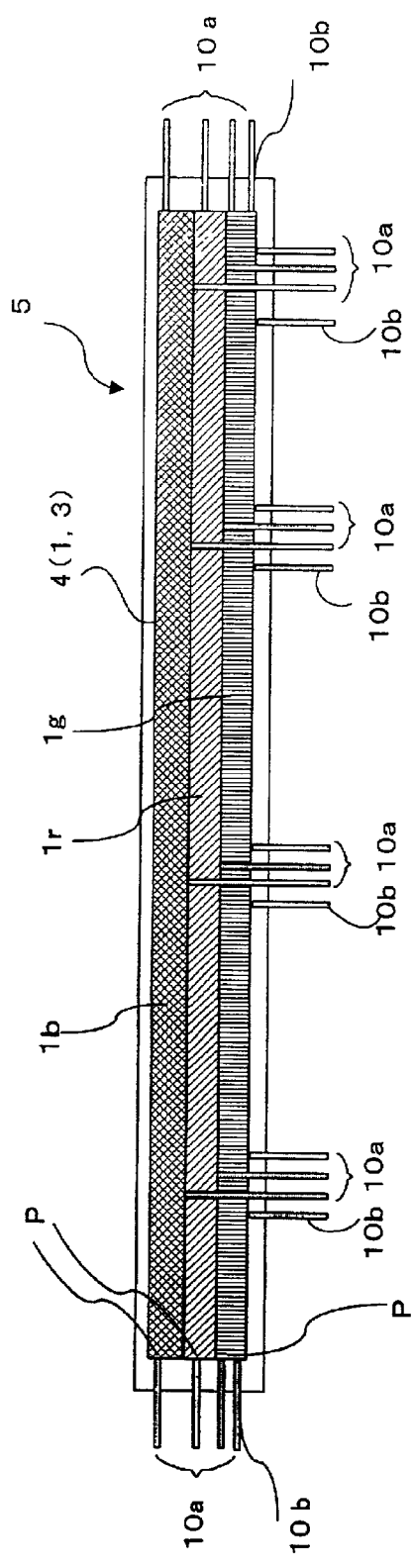

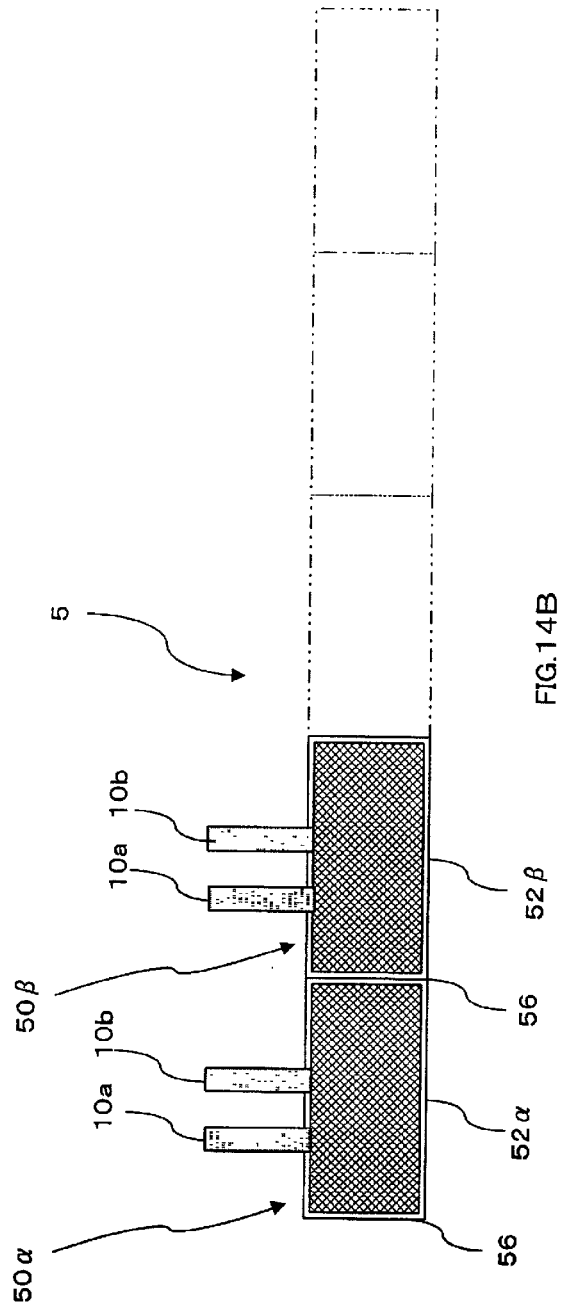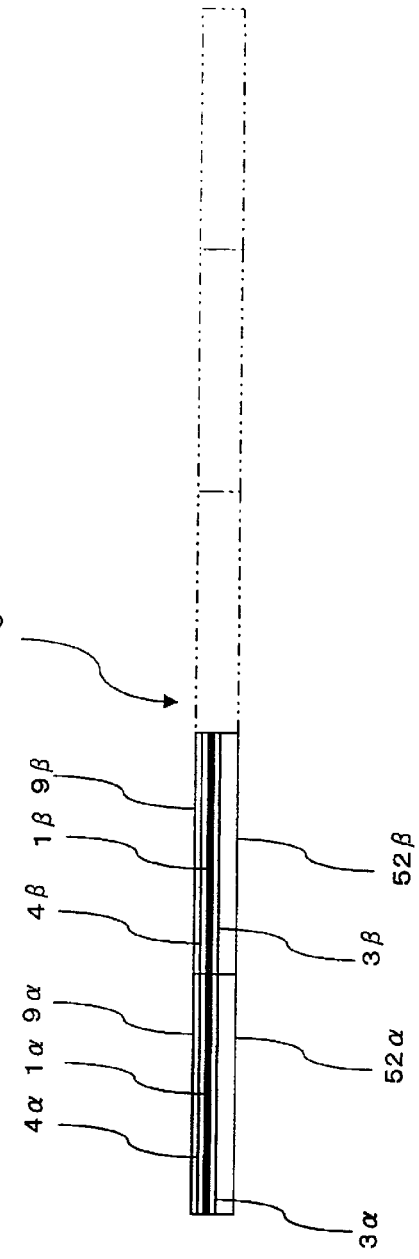

LIGHT SOURCE FOR IMAGE READING APPARATUS AND IMAGE READING APPARATUS

BACKGROUND OF THE INVENTION

1. Field of the Invention

The present invention relates to a light source and more particularly a light source for image reading apparatuses.

2. Prior Art of the Invention

Apparatuses such as a copying machine, scanner, printer, facsimile and facsimile-printer-combined multi-function printer are provided with an image reading apparatus that reads such images as characters and designs drawn on paper, etc. (hereinafter "document").

The reduction optical system (reduction CCD system) has been known as light source for the image reading apparatus. This apparatus has an advantage that even if the document is not in contact with the document table, a sharp image can be obtained by setting the focal depth deep. However, because the light source using the reduction optical system is large in size, the contact system in which information from the document is led to sensor 108 in the same magnification and in an erect image as shown in FIG. 30 comes to be used when the size reduction of thickness reduction of the light source is needed.

In other words, LED arrays 112 are arranged over document table 106 in such a way that they are bilaterally symmetrical and the light sent to and reflected form the document table 106 is received by rod lens array 121. The LED array 112 is formed of many LED elements 125 mounted on substrate 124 in the main scanning direction as shown in FIG. 31, for example. The total length of the rod lens array 121 is the same as the total length of the LED array 112, and the rod lens array 121 is formed in such a way that a plurality of cylindrical rod lenses 122 of a specific length and specific diameter are arranged and sandwiched between substrates 124 as shown in FIG. 32, for example.

In this arrangement, the distance between document table 106 and rod lens 122 can be reduced as compared with the reduction optical system (reduction CCD system), and therefore the size of the whole image reading apparatus can be substantially reduced. Furthermore, if the focal length is reduced, a still thinner type image reading apparatus can be made.

The focal length of the rod lens array 121 (rod lens 122) can be reduced by reducing the diameter of rod lens 122. But the problem is that if the diameter of rod lens 122 is reduced, there arises much optical noise such as cross talk, flare light etc. among rod lenses 122 and an image projected on sensor 108 will be unclear. And in unexamined Japanese patent application 2000-2241656, the applicants of the present patent application propose an arrangement of rod lens array with less optical noise, which will be described later.

Furthermore, because the LED array 112 is a set of point light sources, the uniformity of illuminance can not be secured unless a certain distance is maintained between document table 106 and LED array 112. Because of this, the thickness and size reduction of the contact type apparatus using the LED array 112 has its limit. In unexamined Japanese patent application 2000-2175, the applicants of the present patent application disclose a light source in which electroluminescence is used to reduce the size and thickness.

Its arrangement is as shown in FIG. 33, for example. That is, a transparent electrode layer 103 is formed on a transparent substrate 102 made of glass, a transparent resin or the like which is long in the scanning direction. And an electroluminescence layer 101 is formed on that. Furthermore, a metallic electrode layer 104 is laminated on that. And leads 111a, 111b are led out form the transparent electrode layer 103 and the metallic electrode layer 104.

As an arrangement to realize a color light source using electroluminescence, an arrangement is known in which electroluminescence layers 101r, 101g, 101b, all equal in width on the lateral direction, are laminated as shown in FIG. 34 and emit different colors—R (red), G (green) and B (blue). In the case of a color light source, either transparent electrode layer 103 or the metallic electrode layer 104 is made a common electrode for the respective color electroluminescence layers 101r, 101g, 101b. The other is formed of three individual electrodes corresponding to the respective color electroluminescence layers 101r, 101g, 101b. Leads are led out from the common electrode and individual electrodes.

The way of forming the electroluminescence layers 101 is not limited to the vapor deposition method used for formation of general thin films, but may be printing, coating etc.

In the light source in which electroluminescence is used as optical medium as described above, the emission luminance depends on the position, especially the position in the longitudinal direction of the light source because of various factors. One of them is resistance of the electrode layer (especially transparent electrode layer 103). For this reason, the emission luminance of part of electroluminescence which is much away from connecting point P between lead 111a and transparent electrode layer 3 or lead 111b and the metallic electrode layer 4 is smaller than electroluminescence near connecting point P. If the light source is not uniform in emission luminance as shown, no uniform illuminance can be obtained on the surface of a document, and the image density read by sensor 108 depends on the position in the document.

In addition, when an image of the respective colors is to be read in the same density using a color light source, the emission luminance required in electroluminescence of each color is not the same, G>R>B, for example.

To emit the electroluminescence of each color to the emission luminance required for reading an image like that, electrical adjustment is required. For that purpose, hardware-wise or software-wise addition to the light source leads to increased costs of the light source.

Difference in thickness of electroluminescence can be thought of as another cause for dependence of the emission luminance of the light source on position. That is because the luminance is in inverse proportion to the inter-electrode distance, that is, the distance between transparent electrode layer 103 and the metallic electrode layer 104. Therefore, if an electroluminescence uniform in thickness is used as light source, the scattering of emission luminance can be solved. But it is difficult to make an electroluminescence uniform in thickness.

SUMMARY OF THE INVENTION

It is an object of the present invention to provide a light source using electroluminescence with which emission luminance will be uniform or the illuminance on the face of a document placed a certain distance away from the light source will be uniform.

In the present invention, to make illuminance on the document uniform, which is placed a certain distance away from the light source, with a light source using electroluminescence, the width of electroluminescence is increased as the distance from connecting point P between the lead and the transparent electrode layer or the metallic electrode layer increases as shown in FIGS. 2A and 3A. There are other ways in which the light source is made to emit light with uniform luminance. Those ways involve reducing the thickness of the electroluminescence layer with increase in distance from connecting point P, providing connecting point P at a plurality of spots of the light source, and laminating leads on the periphery of the transparent electrode layer.

Also, to read an image of different colors with the same density as the original document using a color light source, the areas of three color electroluminescence layers are increased or decreased depending on the light-emitting capability of the electroluminescence materials of R (red), G (green), B (blue) and the necessary illuminance required for reading the image.

The areas are increased or decreased by adjusting the width of the three-color electroluminescence according to the necessary illuminance as well as the light-emitting capability of the strip-formed three color electroluminescence layers, all equal in length in the longitudinal direction. There are some ways to effect that. For example, as shown in FIG. 12A, three color electroluminescence layers adjusted in width are arranged side by side in lateral direction. Furthermore, as shown in FIG. 13, three color electroluminescence layers adjusted in width are arranged in the longitudinal direction alternately. Increasing or decreasing the areas of three color electroluminescences is not the only way. The illuminance on the document face may be brought to the level required for reading an image by adjusting the arrangement of the respective electroluminescences.

Furthermore, a light source longer than a certain length can be made by jointing light source pieces as shown in FIG. 14A, whereby the manufacturing cost can be kept down.

The end faces of light source pieces are sealed and the electroluminescence layers are not laminated, and the emission luminance distribution of a light source made by jointing light source pieces is very low in jointing areas. Therefore, emission luminance in the jointing areas are compensated as by increasing the width of the electroluminescence layer or reducing the thickness near the joints of the light source pieces.

BRIEF DESCRIPTION OF THE DRAWINGS

FIG. 1 is a sectional view of a light source of the present invention.

FIG. 2 is a top view of a light source in which the width of the electroluminescence layer increases gradually from the connecting point.

FIG. 4 is a view showing a light source with the thickness of the electroluminescence layer getting thin gradually from the connecting point.

FIG. 5 is a view showing a light source with connecting points provided on both sides of the electroluminescence layer.

FIG. 6 is a view of a light source with a plurality of connecting points provided.

FIG. 14 is a view showing a light source made by jointing light source pieces.

DESCRIPTION OF THE PREFERRED EMBODIMENTS

Embodiment 1

Figure 3A:
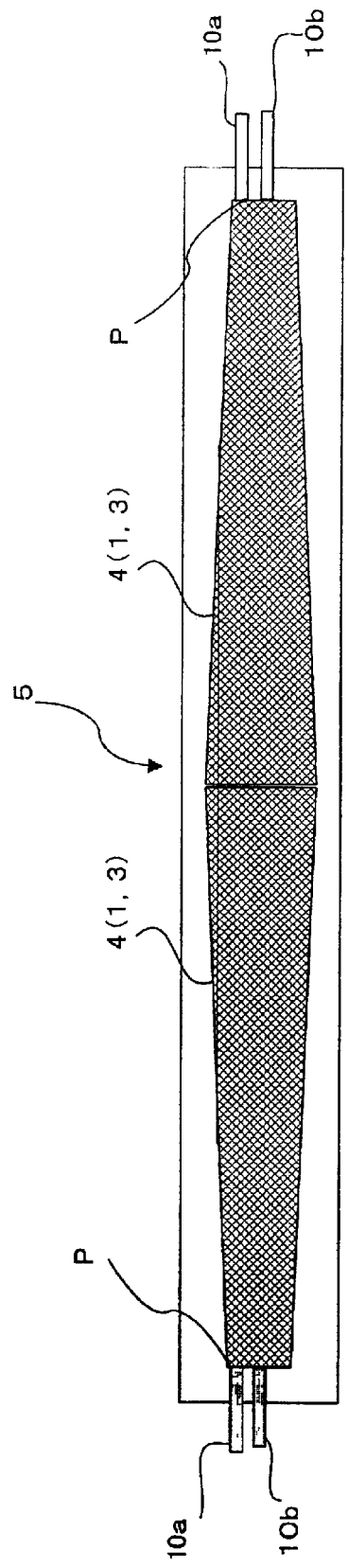
FIG. 3 is a top view of a light source with connecting points provided on both sides of an electroluminescence layer.
Figure 3B:
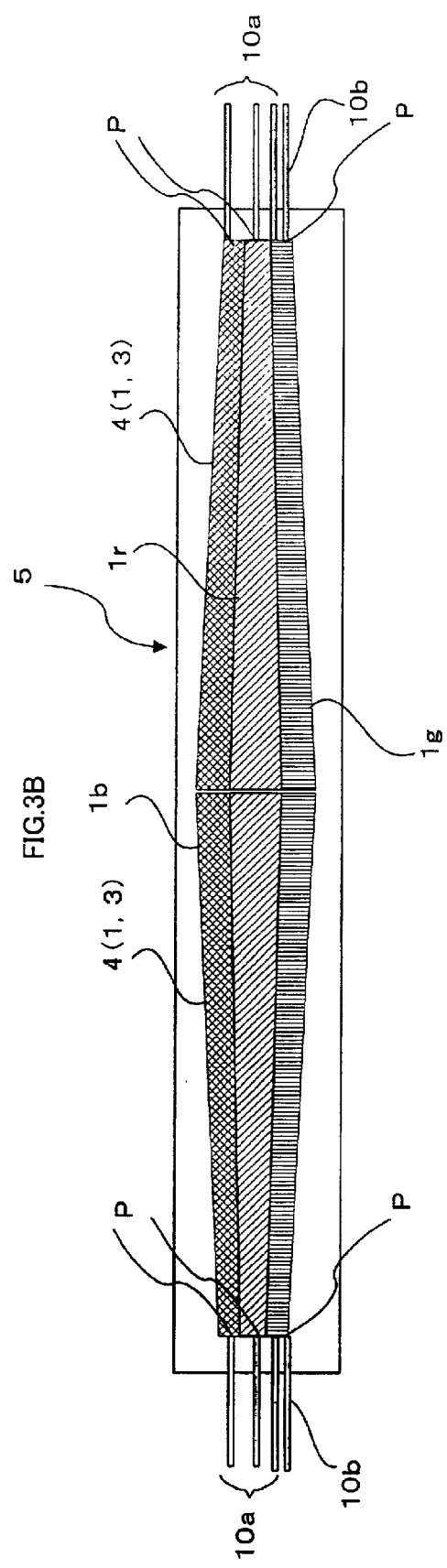

As shown in FIG. 1 and FIG. 2A, a transparent electrode layer 3 is laminated on a transparent substrate 2 which is long in the scanning direction (glass substrate and film-like substrate, for example), and an electroluminescence layer 1 is laminated on that as light medium. Then a metallic electrode layer 4 is laminated on that. That is the same as the prior art. Furthermore, there are provided connecting points P at one end, that is, one of the lateral sides of the transparent electrode layer 3 and the metallic electrode layer 4 between leads 10a, 10b and the metallic electrode layer 4. That arrangement is also the same as in the prior art.

The width of the electroluminescence layer 1 of the present invention increases gradually from connecting point P as shown in FIG. 2A. That is, as the distance from connecting point P increases, the resistance of electrode (especially the resistance of the transparent electrode layer 3) rises. If the width of the electroluminescence layer is the same, luminance drops (the electric field strength decreases) as the distance from connecting point P increases. For this reason, that shape of the electroluminescence layer is adopted to make illuminance uniform on the document face.

For example, the transparent electrode layer 3 is formed of a 0.15 μm thick ITO (indium tin oxide) electrode. And the electroluminescence layer 1 is formed of a TPD (tetraphenyl benzine derivative) layer (0.05 μm thick) as hole transport layer and an Alq3 (8-Hydroxyquinoline Aluminum) as light-emitting layer (0.05 μm thick) that is laminated on the TPD layer. And the metallic electrode layer 4 is formed of Al—Li alloy 0.15 μm thick.

If in this arrangement, there is provided connecting point P at one end or one of the lateral sides of the transparent electrode layer 3, the metallic electrode layer 4 and the length (scanning direction) of the electroluminescence layer 1 is 160 mm, with the smallest width set at 2 mm and the largest width set at 6 mm, illuminance on the document placed a certain distance away from transparent substrate 2 does not depend on the position in the longitudinal direction of light source 5.

As an arrangement of light source 5 of the present invention, two transparent electrode layers 3, electroluminescence layers 1 and metallic electrode layers 4 may be laminated on transparent substrate 2 as shown in FIG. 3A. If, for example, there is provided connecting point P at ends or lateral sides of two transparent electrode layers 3, metallic electrode layers 4, the form of each of the two electroluminescence layers 1 is such that the width increases toward the center of transparent substrate 2 in the longitudinal direction as shown in FIG. 3A. Then, illuminance on the face of a document placed at a position a certain distance away from transparent substrate 2 does not depend on the position in the longitudinal direction of the light source.

In this arrangement, if there are provided connecting points P at ends of two transparent electrode layers 3, the metallic electrode layer 4 in the longitudinal direction, with the length on the longitudinal of the two electroluminescence layers 1 set at 80 mm, the smallest width of the electroluminescence layers 1 set at 2 mm and the largest width (in the center portion of transparent substrate 2) set at 4 mm, illuminance on the face of the document placed a certain distance from the transparent substrate 2 does not depend on the position in the longitudinal direction of light source 5.

Furthermore, as way of preventing the emission luminance from dropping, an arrangement as shown in FIG. 4A can be thought of in which the thickness of the electroluminescence layer 1 is reduced gradually from connecting point P. In other words, the electric field strength drops with increase in the distance from the connecting point P. Therefore, if the thickness is reduced as the above distance, the electric field strength applied between the transparent electrode layer 3 and the metallic electrode layer 4 can be kept uniform and emission luminance can be prevented from falling.

In the arrangement shown in FIG. 4A, the transparent electrode layer 3 is formed of ITO electrode 0.15 μm thick.

In the electroluminescence layer 1, the largest thickness is 0.3 μm, and the smallest thickness is 0.1 μm. The metallic electrode layer 4, which is 0.15 μm, is formed of an Al—Li alloy.

In this arrangement, if connecting points P are provided at one end of the transparent electrode layer 3 and the metallic electrode layer 4, with the length of the longitudinal of the electroluminescence layer 1 set at 160 mm, a light source of which emission luminance does not depend on the position in the longitudinal direction can be obtained.

As shown in FIG. 5A, two transparent electrode layers 3, the electroluminescence layers 1 and metallic electrode layers 4 are laminated on transparent substrate 2, and connecting point P is provided at one end—in the longitudinal direction of transparent substrate 2—of each transparent electrode layer 3 and the metallic electrode layer 4. The two electroluminescence layers 1 are reduced in thickness toward the central portion as seen from the direction along the longitudinal of transparent substrate 2.

In this arrangement, if the length of the longitudinal direction of the electroluminescence layer 1 is set at 160 mm, with the largest thickness at 0.2 mm and the smallest thickness at 0.1 mm, a light source of which emission luminance does not depend on the distance in the longitudinal direction can be obtained.

The hole transport layer (TPD layer) and light-emitting layer (Alq3 layer) of the electroluminescence layer 1 shown in FIGS. 4A and 5A are uniform in thickness everywhere.

FIG. 6A is a top view showing another example of the present invention. In the arrangement shown in FIG. 6A, there are provided connecting points P not only on lateral sides of the transparent electrode layer 3 and the metallic electrode layer 4 but also at other parts. That eliminates the need to adjust the thickness or width of the electroluminescence layer 1, and a light source of which emission luminance does not depend on the position in the longitudinal direction can be obtained.

Figure 7A:
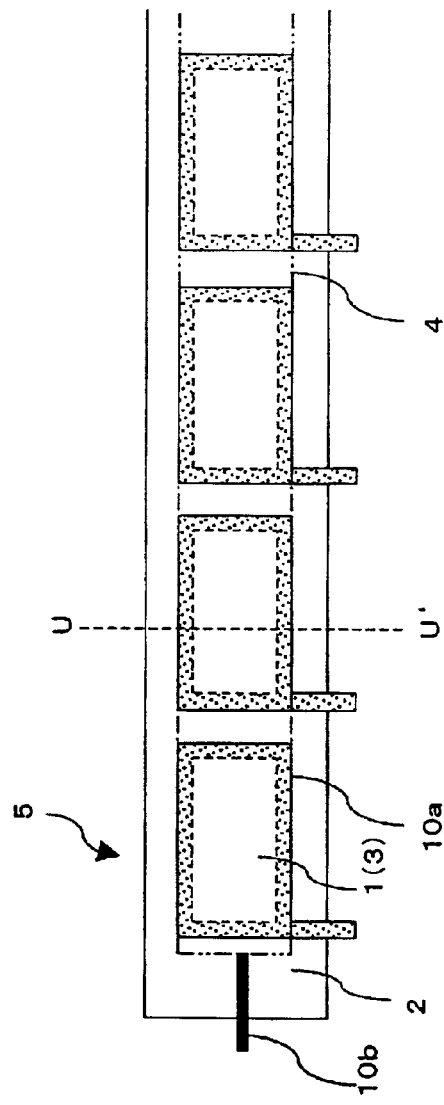
FIG. 7 is a view showing a light source with leads provided in the periphery of a transparent electrode layer.
Figure 7B:
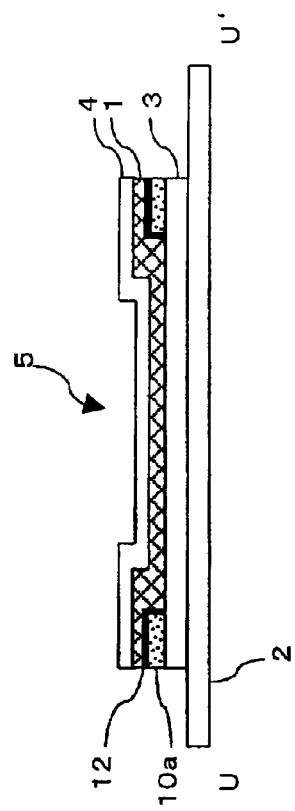

From that viewpoint, arrangements as shown in FIGS. 7A and B can be thought of. A plurality of transparent electrode layers 3 with a longitudinal length of 3 mm and a lateral width of 2.5 mm are laminated on transparent substrate 2, and lead 10a is laminated on all peripheral portion of each transparent electrode layer 3. Furthermore, the following arrangement can be thought of, that is, insulating film 12 of polyimide etc. is laminated on the surface of the lead 10a, and the electroluminescence layer 1 is laminated on the transparent electrode layer 3 and insulating film 12. Furthermore, the metallic electrode layer 4 that covers all the laminated electroluminescence layers 1 is laminated.

In this arrangement, lead 10a comes in contact with all the peripheral portion of the transparent electrode layer 3, and therefore the drop in electric field strength by the transparent electrode layer 3 can be substantially reduced as compared with the arrangements shown in FIG. 2A to FIG. 6A. It is noted that the reason for installing insulation between lead 10a and the electroluminescence layer 1 is this. Even if the electroluminescence layer 1, the part on the lead 10a, emits light, the light emitted from that part can not pass to the outside through transparent substrate 2 because of lead 10a, and applying current to the part on lead 10a offers no advantages.

In the arrangement shown in FIG. 7A, the transparent electrode layer 3 is formed of ITO electrode 0.15 μm thick, while the electroluminescence layer 1 is made of TPD layer (0.05 μm thick) as hole transport layer and Alq3 layer (0.05 μm thick) as light-emitting layer laminated on the hole transport layer, and the metallic electrode layer 4 is formed of Al—Li alloy 15 μm thick. If the length of the longitudinal direction of the electroluminescence layer 1 is 160 mm, the distribution of emission luminance is high in peripheral area and low in central area as shown in FIG. 8A.

Figure 8C:
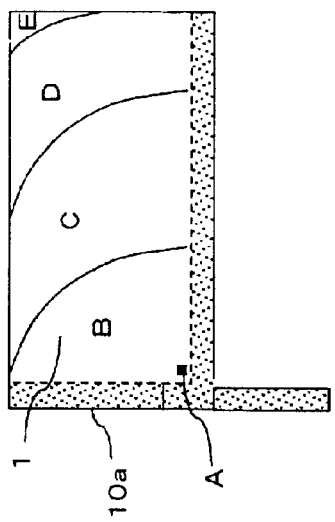
FIG. 8 is a view showing the emission luminance distributions of a light source.
Figure 8A:
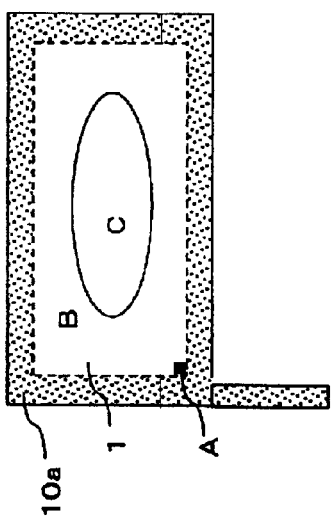
Figure 8B:
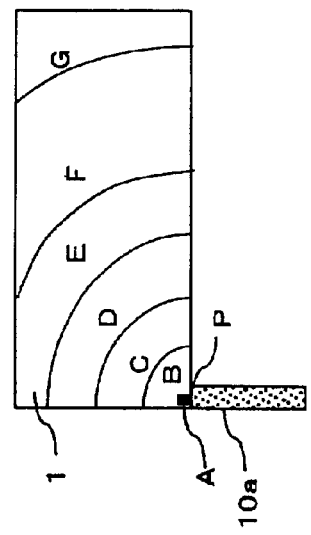
Figure 9:
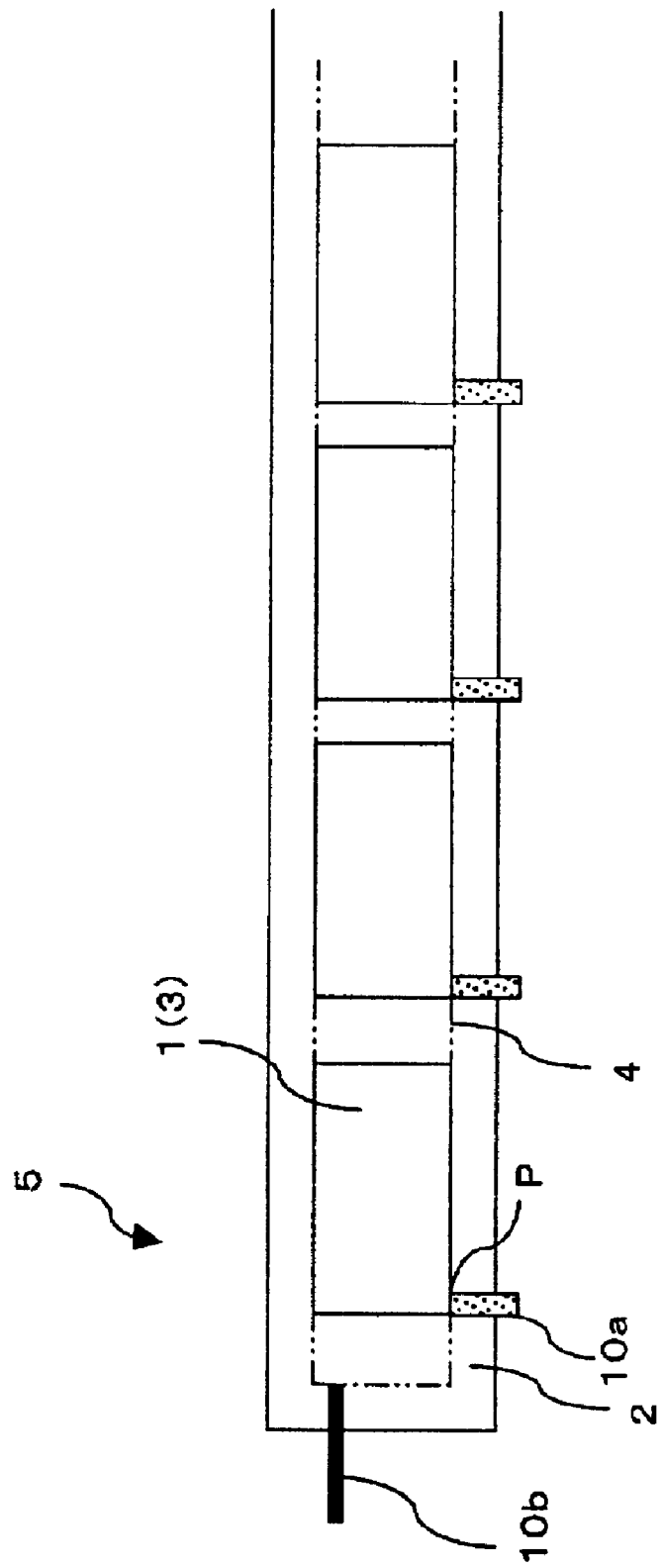
FIG. 9 is a view showing a light source in which a transparent electrode layer and a lead are connected at one point.

When the transparent electrode layer 3 and lead 10a are connected via a connecting point P as shown in FIG. 9, the distribution of emission luminance shows that emission luminance is higher near connecting point P and is low in regions away from connecting point P as shown in FIG. 8 B.

Electroluminescence in Area B, area C, area D, area E, area F, and area G shown in FIGS. 8A, B are lower than electroluminescence Point A in emission luminance by 0–2%, 2–4%, 6–8%, 8–10%, 10–12%, 12–14% respectively. As shown in FIGS. 8A, B, if lead 10a is laminated on all the peripheral portion of the transparent electrode layer 3, the scattering of emission luminance of the electroluminescence layer 1 can be reduced.

Figure 10:
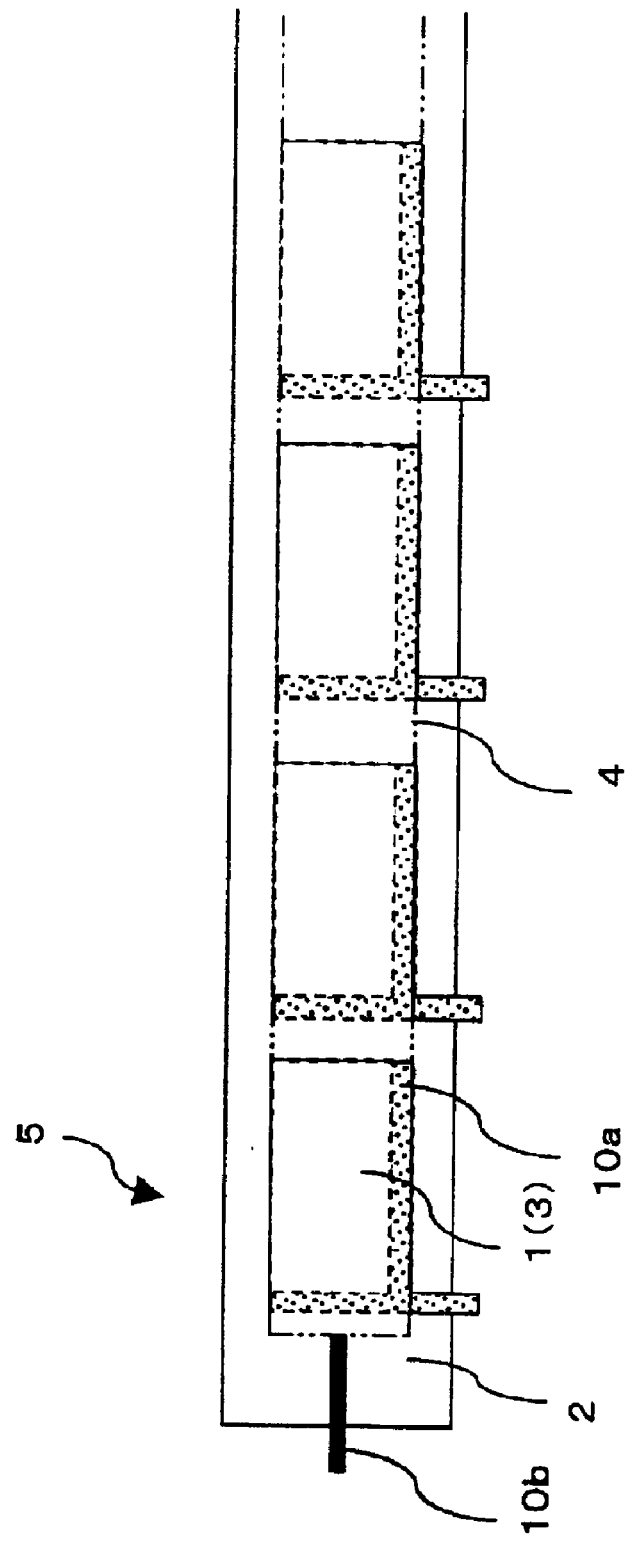
FIG. 10 is a view of a light source in which leads are laminated in the periphery of a transparent electrode layer.

In the above description, lead 10a is laminated on all the peripheral portion of the transparent electrode layer 3 as shown in 7A. Lead 10a may also be laminated on part of the peripheral portion as shown in FIG. 10. In this case, the emission luminance of the electroluminescence layer 1 shows a distribution as shown in FIG. 8C.

In case electroluminescence layers 1r, 1g, 1b that emit R (red), G (green) and B (blue) as light medium is used, three color electroluminescences 1r, 1g, 1b are laminated on the transparent electrode layer 3 so that the electroluminescences are arranged in the lateral direction. If electroluminescence layers 1r, 1g, 1b are used as light medium of light sources shown in FIG. 2A to FIG. 6A, the arrangement will be as shown in B in each of FIG. 2 to FIG. 6. In the arrangement using electroluminescences 1r, 1g, 1b, if the same form of the electroluminescence layer 1 and connection between leads 10a, 10b and the transparent electrode layer 3, the metallic electrode layer 4 as described above are adopted, the drop in emission luminance of the respective color electroluminescence layers 1r, 1b, 1g can be compensated or the illuminance on the face of the document placed a certain distance away from the light source can be made uniform.

Figure 11:
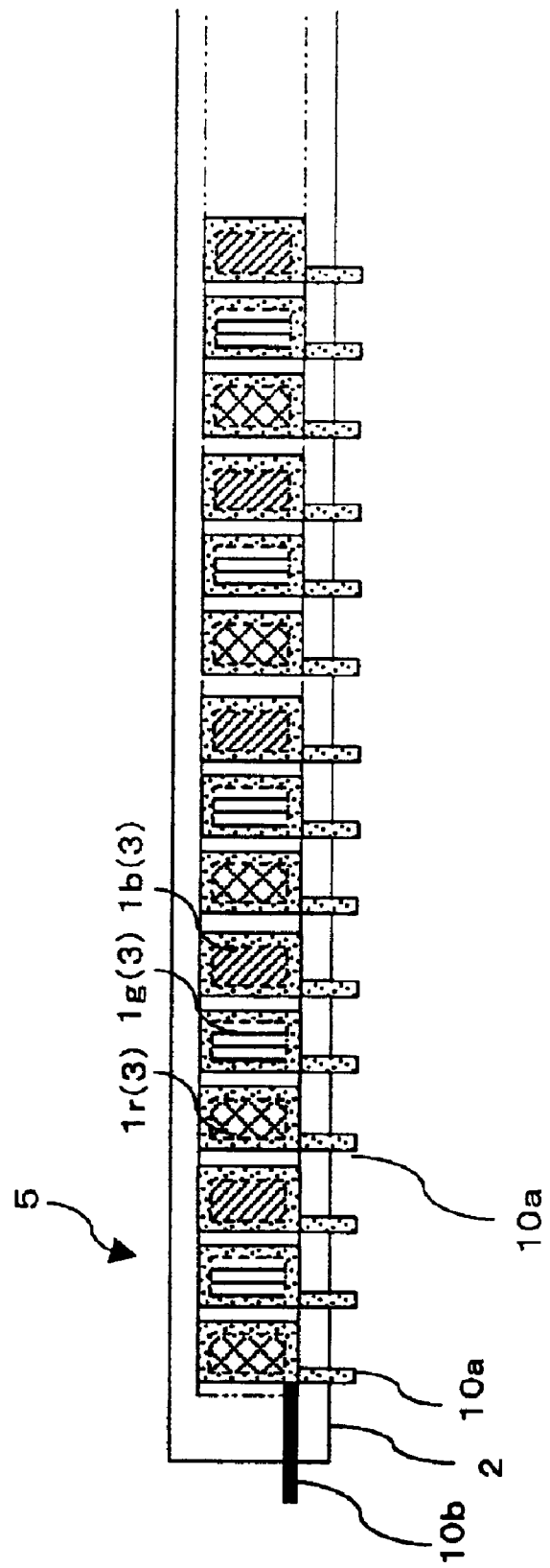
FIG. 11 is a view of a light source in which leads are laminated in the periphery of a transparent electrode layer.

The arrangement of electroluminescence layers 1r, 1g, 1b is not restricted to that shown in FIG. 2B to FIG. 6B. Furthermore, in the arrangement as shown in FIG. 7A, in case electroluminescence layers 1r, 1g, 1b are used, a plurality of transparent electrodes are laminated on the transparent substrate 2 of which longitudinal length of each transparent electrode is 2.5 mm and the lateral width is 1 mm. And each electroluminescence layer 1r, 1g, 1b is laminated on each transparent electrode alternately in the longitudinal direction of the transparent substrate 2 as shown in FIG. 11.

Embodiment 2

Figure 12A:
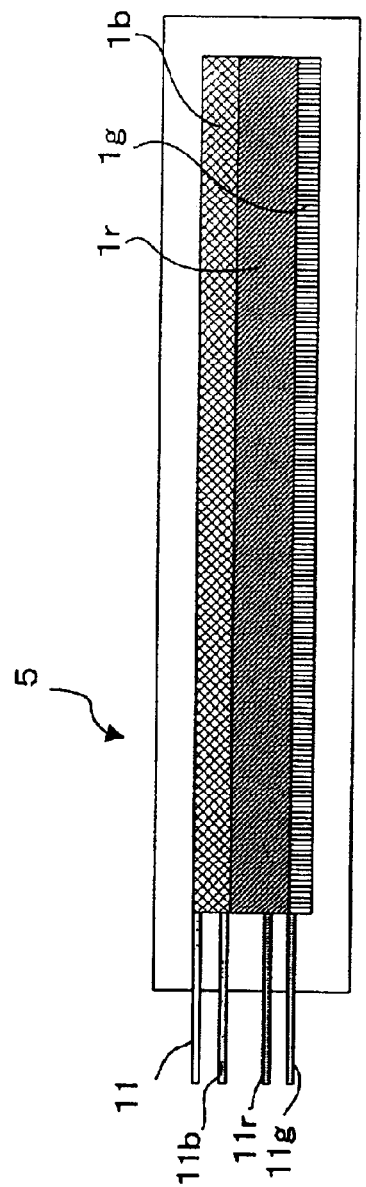
FIG. 12 is a top view showing a light source in which each color electroluminescence layer has an area required for necessary illuminance.
Figure 12B:
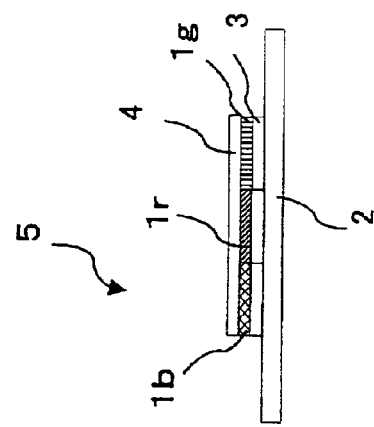

Light source 5 using electroluminescence is formed as shown in FIGS. 12A, B, for example. That is, the transparent electrode layer 3 is laminated on transparent substrate 2, and electroluminescence layers 1r, 1g, 1b are laminated on that. Then, the metallic electrode layer 4 is laminated on that. As electrode, either the transparent electrode layer 3 or the metallic electrode layer 4 is adopted as common electrode for electroluminescence layers 1r, 1g, 1b, while the other is used as individual electrodes for the respective electroluminescence layers 1r, 1g, 1b. The common electrode and individual electrodes are connected with leads 11, 11r, 11g, 11b. In this example, transparent electrode layers 3 are used as individual electrodes while the metallic electrode layer 4 is a common electrode.

Electroluminescence layers 1r, 1g, 1b are arranged and laminated side by side in the lateral direction as shown in FIG. 12A. The width of each of electroluminescence material 1r, 1g, 1b is set on the basis of the light-emitting capability (emission luminance, for example) of the respective electroluminescence layers 1r, 1g, 1b and illuminance required for reading an image.

For example, when electroluminescence layers 1r, 1g, 1b with luminance of R: 400 cd/m$^2$, G: 2000 cd/m$^2$, B: 400 cd/m$^2$ are used in an image reading apparatus with illuminance on the document face required for reading an image of R: 900 lux, G: 2000 lux, B: 500 lux, the ratio of width (light emitting area) of electroluminescence layers 1r, 1g, 1b may be theoretically 1r:1g:1b=2.25:1:1.25.

But because of various factors, the width of the light source is not proportional to illuminance at the position a certain distance away from the light source, the ratio of width of electroluminescence layers 1r, 1g, 1b should be 1r:1g:1b=2.8:1:1.5.

For example, when electroluminescence layers 1r, 1g, 1b for the respective colors R, G, B which are 0.1 μm thick and 160 mm in length in the longitudinal direction are used as light source for the image reading apparatus, the widths of electroluminescence layers 1r, 1g, 1b for the respective colors R, G, B are R=2.8 mm: G=1.0 mm: B=1.5 mm.

In the arrangements shown in FIGS. 12A, B, the strip-formed electroluminescence layers 1r, 1g, 1b for the respective colors are arranged in the lateral direction and laminated on the transparent electrode layer 3.

Figure 13:
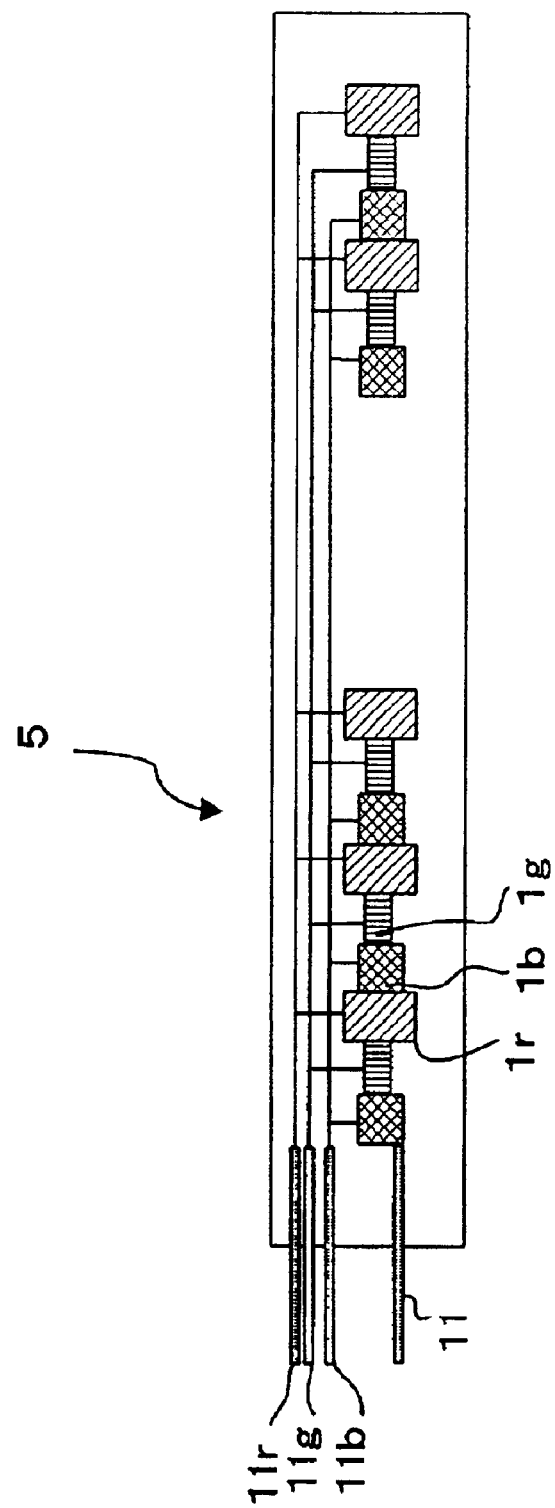
FIG. 13 is a top view showing a light source in which the respective color electroluminescence layers are arranged alternately in the longitudinal direction.

As alternative to that, a plurality of electroluminescence layers 1r, 1g, 1b for respective colors may be arranged in the longitudinal direction as shown in FIG. 13.

For example, when using a light source for the image reading apparatus in which illuminance on the document face required for reading an image is R: 900 cd/m$^2$, G: 2000 cd/m$^2$, B: 500 cd/m$^2$ and emission luminance electroluminescence layers 1 for the respective colors are R: 400 cd/m$^2$, G: 2000 cd/m$^2$, B: 400 cd/m$^2$, the ratio of lateral side lengths of electroluminescence layers 1r, 1g, 1b should be 1r:1g:1b= 2.8:1:1.5.

In the arrangement shown in FIG. 13, the respective electroluminescence layers 1r, 1g, 1b are each 0.3 mm in longitudinal length, and 0.1 μm thick, and the widths in lateral direction of transparent substrate 2 are 1r=2.8 mm: 1g=1.0 mm: 1b=1.5 mm, for example. The respective electroluminescence layers 1r, 1g, 1b are arranged in longitudinal direction of transparent substrate 2 alternately and the total length of the electroluminescence layer 1 may be 160 mm.

In that way, the light-emitting areas of electroluminescence layers 1r, 1g, 1b for the respective colors R, G, B are adjusted, and illuminance of the respective colors R, G, B required for reading an image can be obtained on the document.

The emission luminance of electroluminescence layers 1r, 1g, 1b is different depending on the kind of material of the electroluminescence layer 1, and the ratio of widths (light-emitting areas) of electroluminescence layers 1r, 1g, 1b is different from material to material.

Embodiment 3

It is technically difficult to make an electroluminescence uniform in thickness and longer than a certain length. For this reason, a long light source 5 with electroluminescence as light medium is made by jointing light source pieces 50 as shown in FIGS. 14A, B.

As shown in FIGS. 14A, B, light source pieces 50α, 50β . . . are formed by laminating transparent electrode layers 3α, 3β . . . on transparent substrate pieces 52α, 52β . . . —shorter than the longitudinal direction of light source 5—, laminating electroluminescence layers 1α, 1β . . . on the transparent electrode layers on that, and furthermore, laminating metallic electrode layers 4α, 4β . . . on the electroluminescence layers on that.

In addition, lead 10a is connected with transparent electrode layers 3α, 3β . . . , and lead 10b is connected with metallic electrode layers 4α, 4β . . . .

Meanwhile, electroluminescence used here is susceptible to moisture. To prevent moisture from getting into light source pieces 50α, 50β . . . and to protect electroluminescence against physical damage, electroluminescence is subjected to sealing treatment. In other words, light source pieces 50α, 50β are made in the following way.

Figure 15:
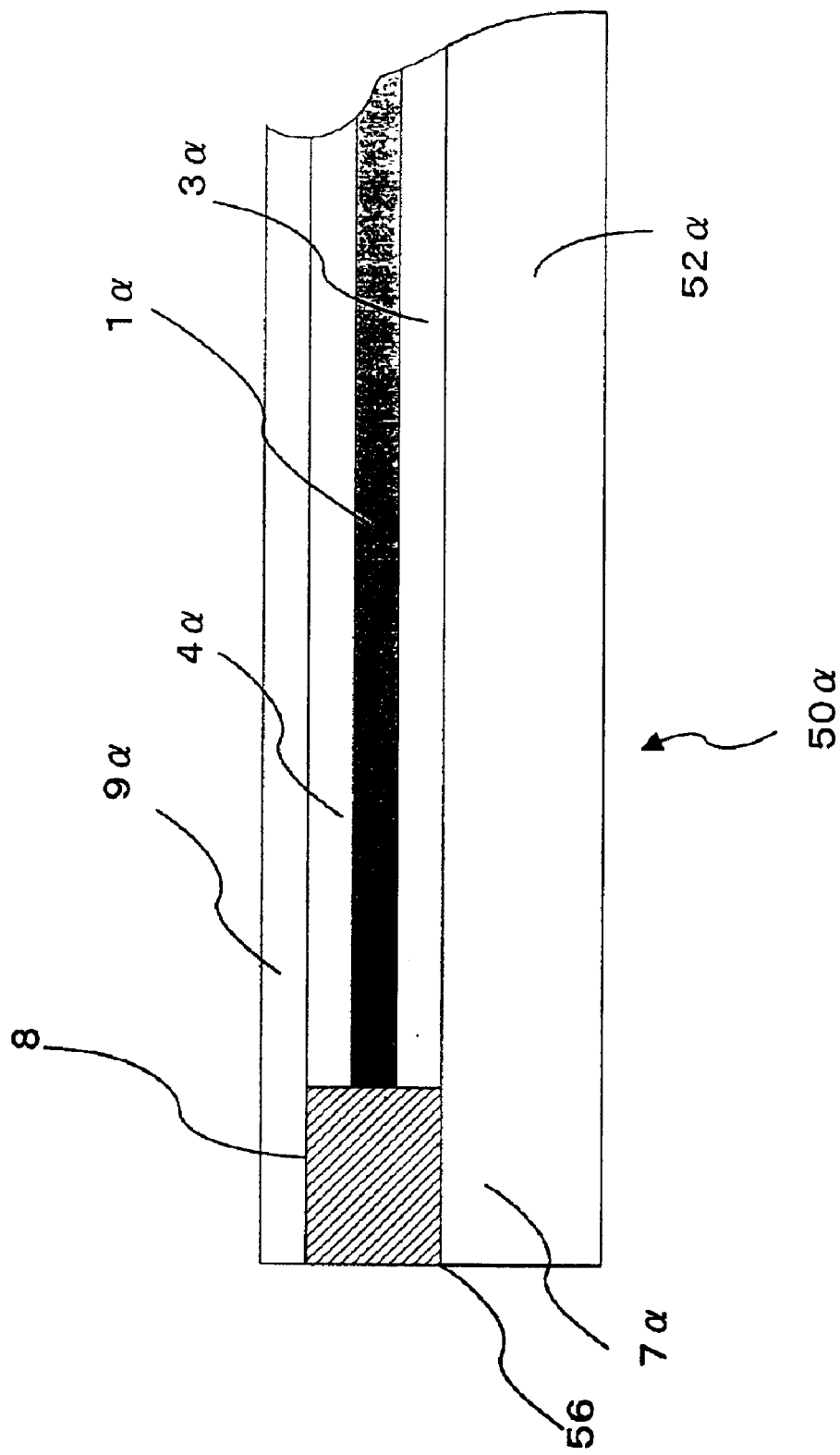
FIG. 15 is a sectional view of a light source.

As shown in FIG. 15, the transparent electrode layer 3, the electroluminescence layer 1α and the metallic electrode layer 4 are laminated except for sealed portion 7α which is 0.3 to 0.5 mm deep from end face 56 of transparent substrate piece 52. Then, adhesive resin 8 such as epoxy resin for sealing is filled into sealed portion 7α. Finally, the metallic electrode layer 4α and resin 8 are covered with sealing glass 9α.

Light source pieces 50α, 50β . . . thus made are jointed into one light source 5 by applying an adhesive etc. on the end faces 56. Therefore, if the length of the longitudinal direction of each of light source pieces 50α, 50β . . . is such (about 80 mm) that transparent electrode layers 3α, 3β . . . , metallic electrode layers 4α, 4β . . . or electroluminescence layers 1α, β . . . are formed with uniform thickness (by vapor deposition method, for example), illuminance on the face of the document placed a certain distance from the light source can be made uniform.

Embodiment 4

As shown in FIG. 14A, electroluminescence layers 1α, 1β . . . making up light source pieces 50α, 50β . . . are rectangular in form, and the joint area of each of light source pieces 50α, 50β . . . is parallel with the lateral sides of light source pieces 50α, 50β . . . . Therefore, if light source pieces 50α, 50β . . . are jointed, no light is emitted at and near the end faces 56 because of sealed portions 7α, 7β . . . . The luminance distribution of light source 5 made by jointing light source pieces 50α, 50β . . . is almost nil in sealed portions 7α, 7β . . . . In this embodiment, therefore, the attenuation of luminance is compensated in the following way.

Figure 16:
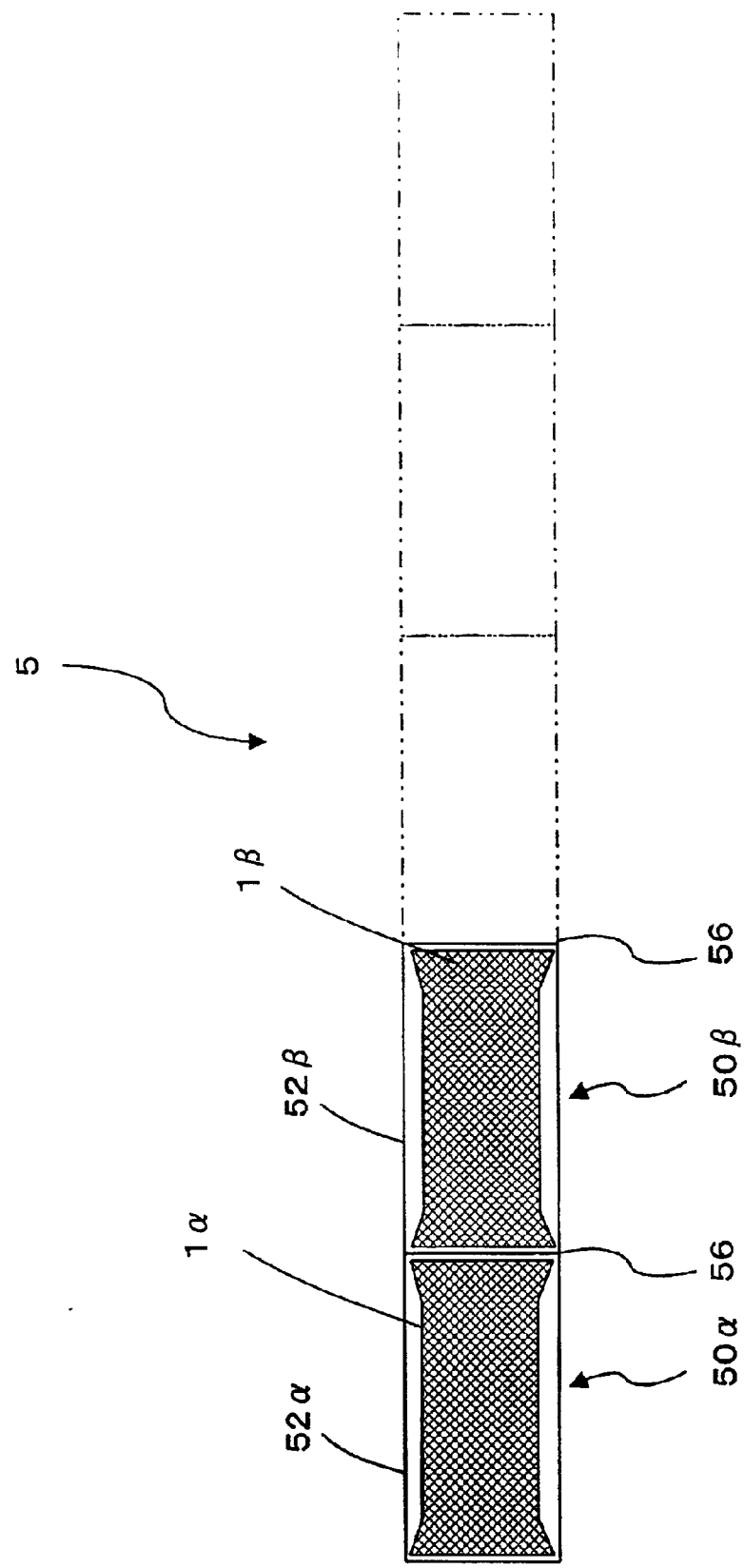
FIG. 16 is a view of a light source which is large in width of the electroluminescence layer at and near the end faces.

FIG. 16 is a view showing the present embodiment. The width of electroluminescence layers 1 in the area within 10 mm from end faces 56 of light source pieces 50α, β . . . is larger than in the other area.

That is, the widths of electroluminescence layers 1α, 1β . . . are small in the central portion of light source pieces 50α, 50β . . . and large in end portion, and thus the attenuation of emission luminance near end face 56 where light source pieces 50α, 50β . . . are jointed can be compensated.

Embodiment 5

Figure 17:
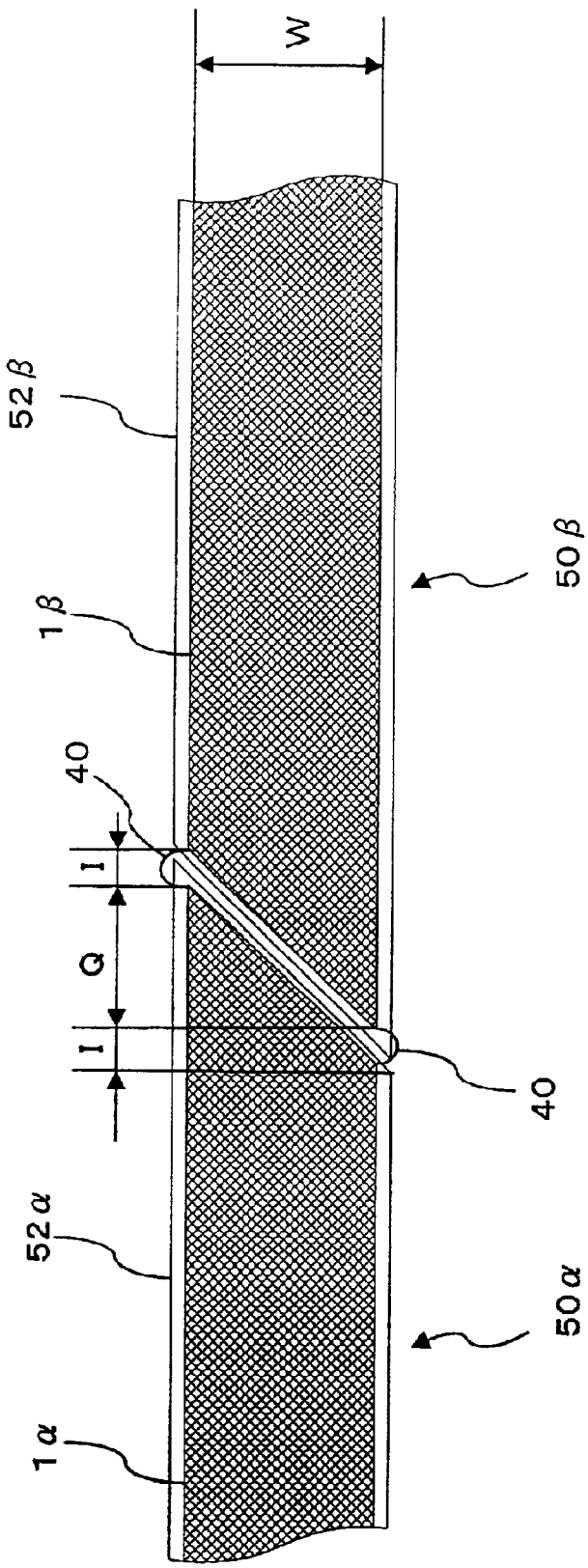
FIG. 17 is a view of a light source in which the end faces are slanted in relation with the lateral direction of the light source.

FIG. 17 is a make-up view of another embodiment of the present invention. In Embodiment 3, the electroluminescence layer 1 of light source piece 50 is rectangular in form, and emission luminance at and near end face 56 is almost nil. If the end face 56 forms some angle against the lateral side of transparent substrate piece 52, the above problem is alleviated. That is, as shown in FIG. 17, each of light source pieces 50α, 50β . . . and electroluminescence layers 1α, 1β . . . is parallelogrammic. For example, light source pieces 50α, 50β . . . are jointed in such a way that the lateral sides are partly overlapped. In this way, sealed portions 7α, 7β . . . of electroluminescence layers 1α, 1β . . . are extended, and concentration of sealed portion 7 to a limited area can be avoided.

In order that the emission luminance of light source 5 made by jointing such parallelogrammic light source pieces 50α, 50β . . . does not depend on position in the longitudinal direction, it is desirable that the length Q of overlapping between the electroluminescence layer 1α of light source piece 50 α and the electroluminescence layer 1β of light source piece 50 β should not smaller than 5 times the length I between the electroluminescence layer 1α and 1β (length of missing part 40). It is also desirable that the width W of electroluminescence layers 1α, 1β is not larger than 1.7 times the overlapping length Q.

Figure 18:
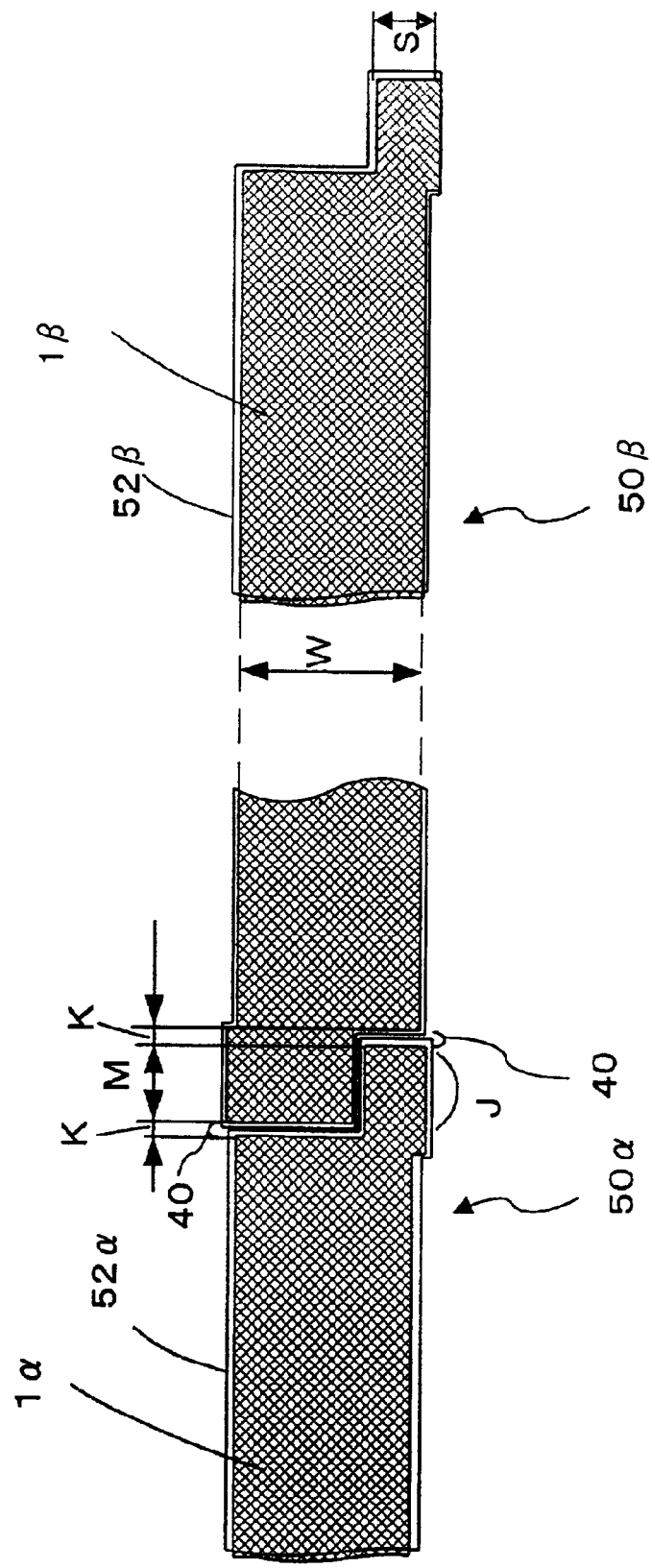
FIG. 18 is a view showing a light source made up of L-shaped light source pieces.

Also, light source piece 50 may be shaped like the letter L as shown in FIG. 18. In this arrangement, the width of the light source in the overlapping portion J where the electroluminescence layer 1α of light source piece 50 α overlaps with the electroluminescence layer 1β of light source piece 50β is made larger than the width in the other portion. Increasing the width of light source 5 makes it possible to increase the width of the electroluminescence layer 1 in overlapping portion J.

In order that a light source in which emission luminance does not depend on position in longitudinal direction in the arrangement as shown in FIG. 18, it is desirable that the length M in the longitudinal direction of light source 5 where the electroluminescence layer 1α overlaps with the electroluminescence layer 1β is not smaller than 5 times the distance K between the electroluminescence layer 1α and 1β.

To further alleviate the dropping of emission luminance in the joint area, it is desirable that missing part 40 in the electroluminescence layer 1 formed in the joint between light source pieces 50α, 50β avoids the median line parallel with the longitudinal direction. In making missing part 40 avoid the median line, it is desirable that the width S of a protrusion formed at the end of each of light source pieces 50α, 50β . . . is not smaller than one third of the width W of the electroluminescence layer 1.

Embodiment 6

Figure 19:
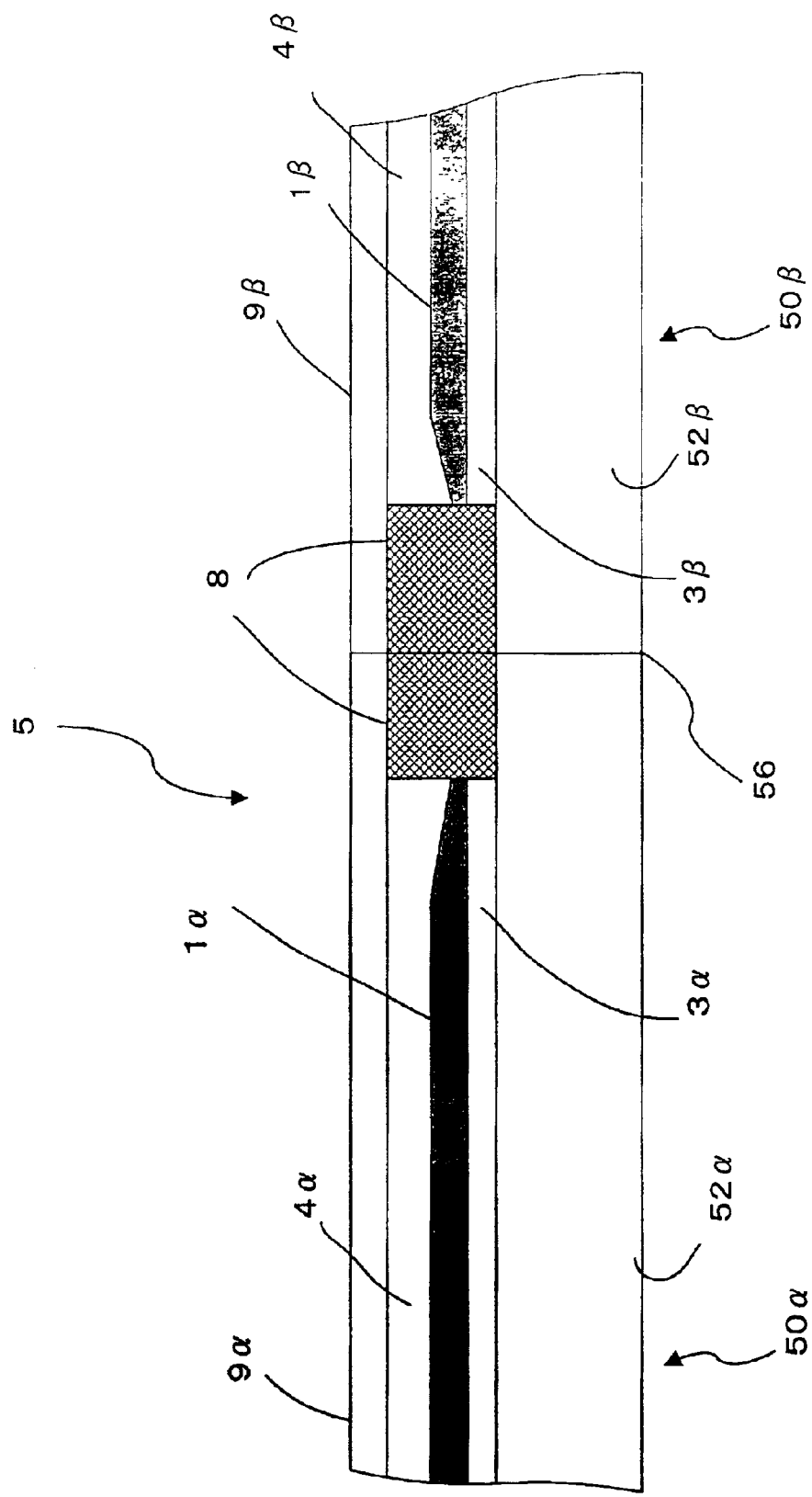
FIG. 19 is a sectional view of light source pieces in which the electroluminescence layers are thin near the end faces.

Emission luminance of light source pieces 50α, 50β . . . also depends on the electric field strength of electroluminescence layers 1α, 1β . . . . In other words, with the inter-electrode potential fixed, the thinner the thickness of the electroluminescence layer 1, the grater electric field strength and the higher the emission luminance of electroluminescence layers 1α, 1β . . . . As shown in FIG. 19, therefore, it is possible to achieve the object of the present invention if the thickness of the electroluminescence layer 1, within 10 mm from the end face 56, is made thinner than the film in the central portion, for example.

Embodiment 7

Figure 20:
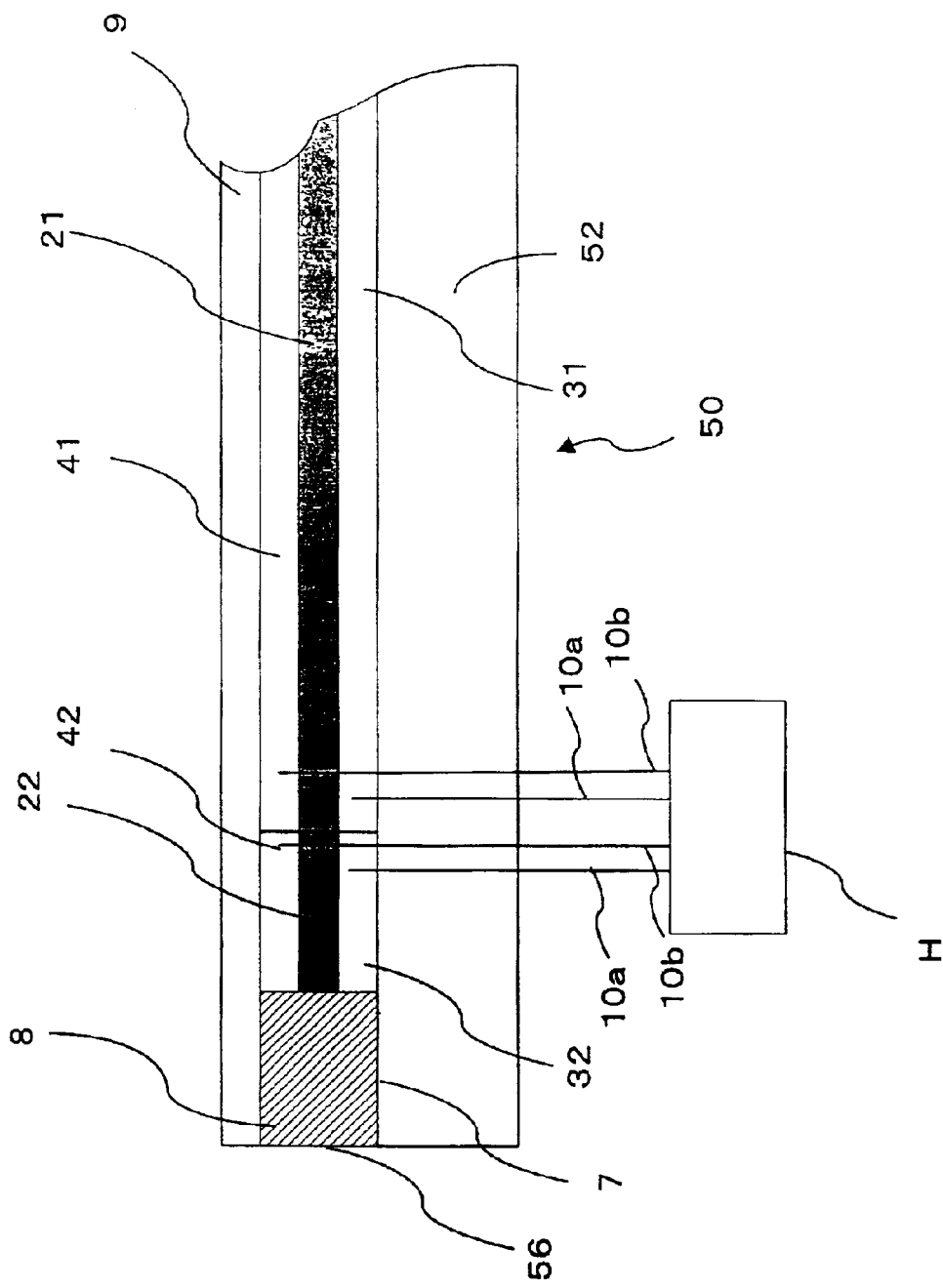
FIG. 20 is a make-up view showing a light source piece provided with a central light emitting layer and an end light emitting layer.

Also to compensate the emission luminance in the joint portion, the electroluminescence layer 1 may be formed of a central light-emitting layer 11 and end light emitting layers 12 at both ends with electroluminescence as shown in FIG. 20.

For example, transparent electrode 32 corresponding to the both end light emitting layers 12 are laminated within 5 mm from sealed portion 7 of transparent substrate piece 52, and end light emitting layer 12 is laminated over that, and furthermore, the metallic electrode layer 42 of end light emitting layers 12 are laminated over that. Furthermore, a transparent electrode 31 corresponding to the central light-emitting layer 11 is laminated inside the end light emitting layer 12. And the central light-emitting layer 11 is laminated over the transparent electrode 31, and in addition, the metallic electrode layer 41 is laminated over the central light-emitting layer 11. The transparent electrodes 31, 32 are connected with lead 10a, and the metallic electrode layers 41, 42 are connected with lead 10b.

Now, to obtain specific emission luminance in the joint portion, light-emitting control means H that controls the light emitting of the central light-emitting layer 11 and end light emitting layer 12 applies voltage between transparent electrode 32 of end light emitting layer 12 and the metallic electrode layer 42 through leads 10a, 10b—voltage higher than that between transparent electrode 31 of the central light-emitting layer 11 and the metallic electrode layer 41. That increases emission luminance of end light emitting layer 12. If light source 5 is made by jointing such light source pieces 50, the emission luminance of light source 5 does not depend on position in the longitudinal direction.

To obtain light source 5 that emits light with luminance uniform in the longitudinal direction, end light emitting layer 12 may be made thinner than the central light-emitting layer 11.

Embodiment 8

If light source 5 thus made is used as light sources 5a, 5b in an image reading apparatus which will be described below, R, G, B are generally turned on one after another, and image data of the respective colors are read and finally the color data read are synthesized. In a special application method, a specific color is turned on and reading is executed, and an image of the specific color is not read. This specific color may be R, G or B or a combination of the respective colors R, G, B.

Figure 21:
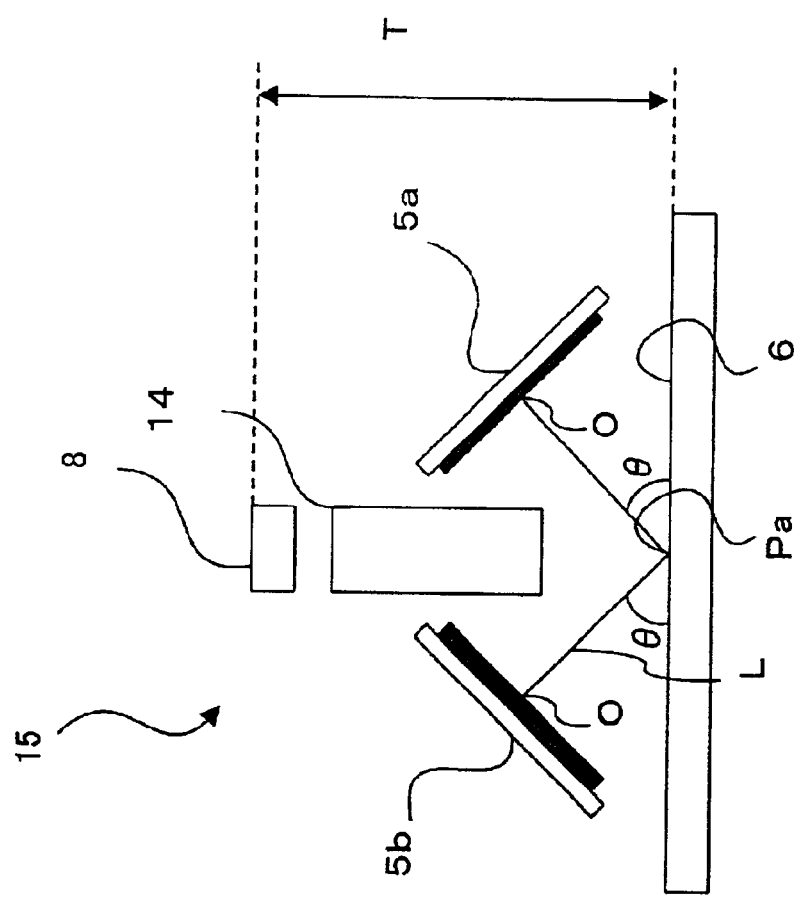
FIG. 21 is a view showing a light source unit.

In case light source 5 thus constituted is used as light source for image reading apparatuses such as copying machine, light sources 5 are installed above and slanted against reading position Pa and symmetrically at right and left sides as shown in FIG. 21. At a position in the vertical and upward direction of the reading position Pa is installed fiber lens 14 which will be described later.

In this arrangement, since light sources 5a, 5b according to the present invention are of the surface light emitting type, illuminance on reading position Pa does not depend position in the longitudinal direction of light sources 5a, 5b even if the light source is brought near to reading position Pa. If the light sources 5a, 5b are brought close to reading position Pa, it is possible to reduce the size of light source unit 15 made of the light sources 5a, 5b and fiber lens 14. Also, if the light source unit 15 is reduced in size, the whole image reading apparatus can be made smaller in size.

Figure 31:
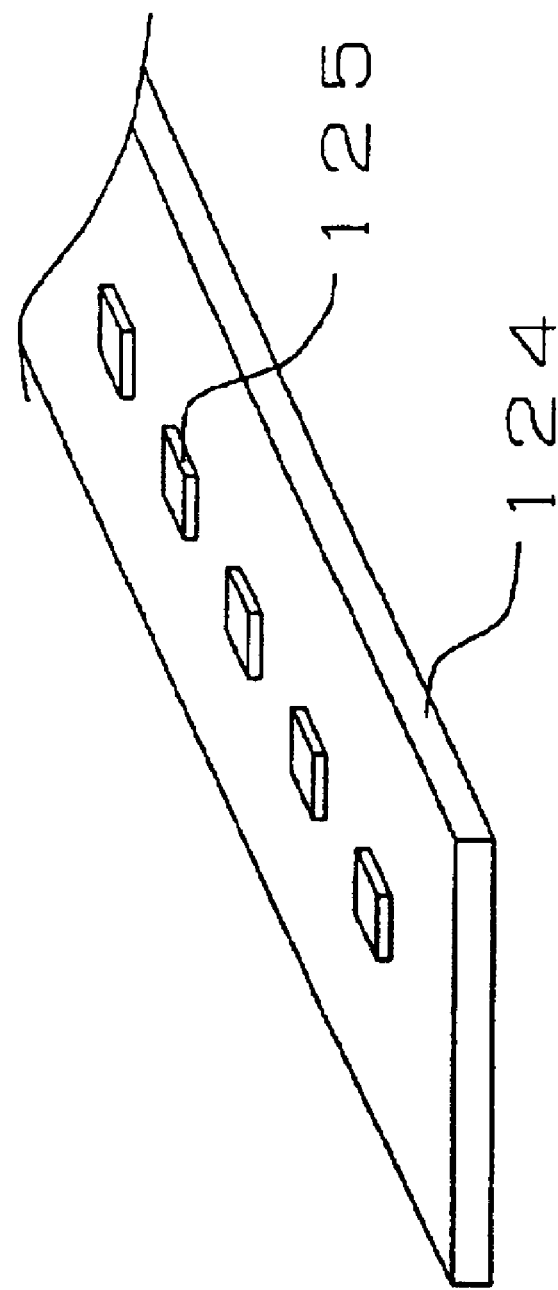
FIG. 31 is a perspective view of a light source provided in the prior art image reading apparatus of the contact type.
Figure 32:
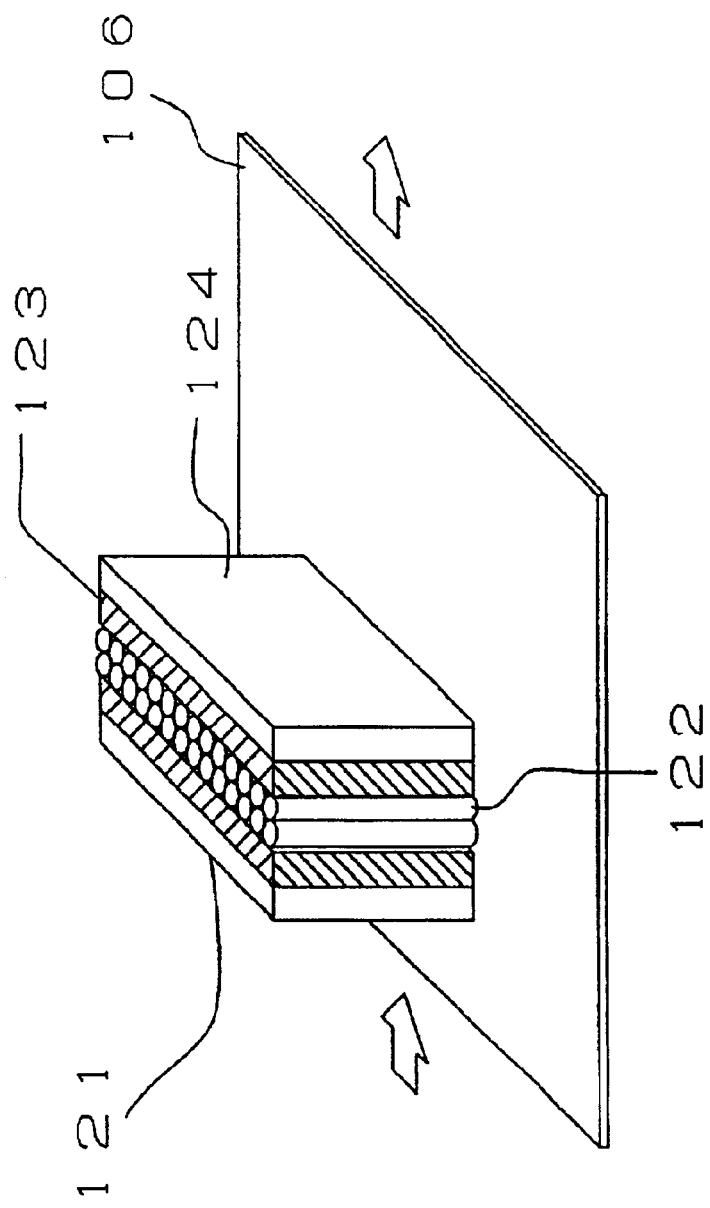
FIG. 32 is a perspective view of a rod lens array provided in the prior art image reading apparatus of the contact type.
Figure 33:
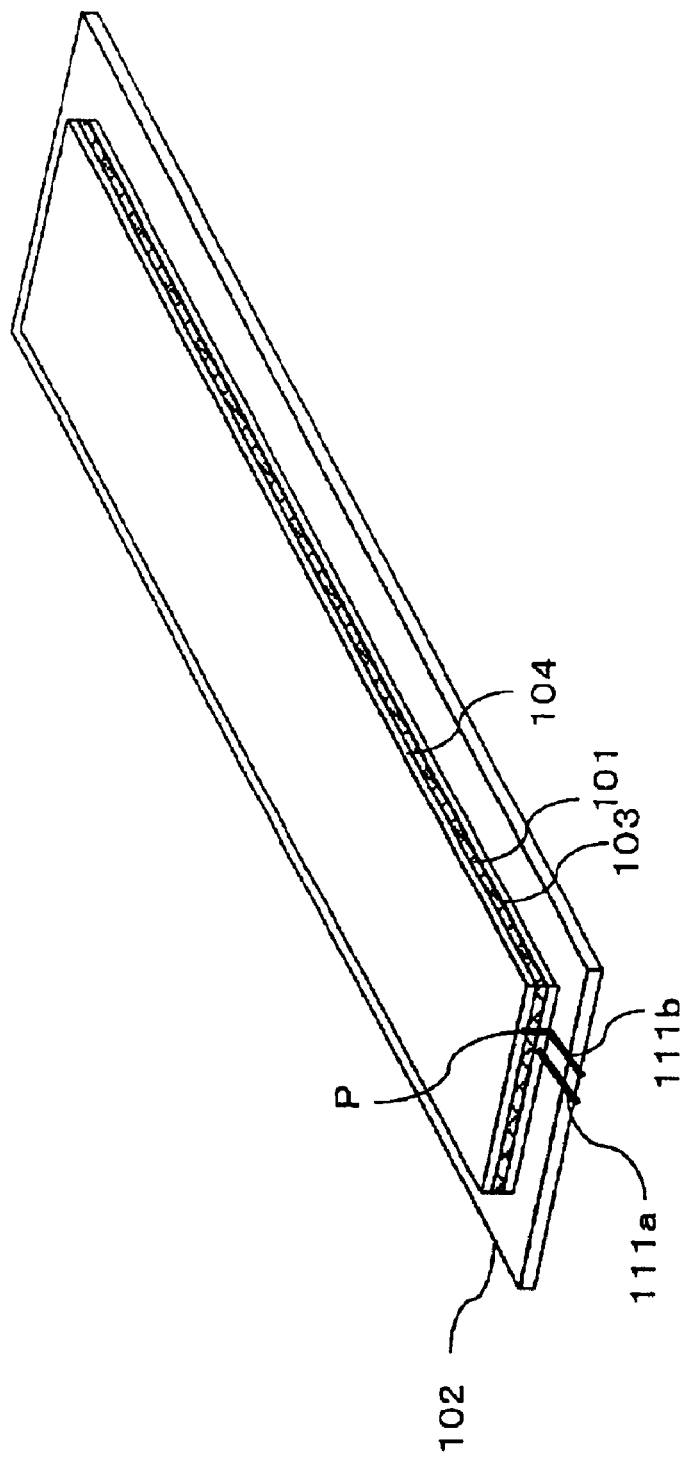
FIG. 33 is a perspective view of a prior art light source using electroluminescence.
Figure 34:
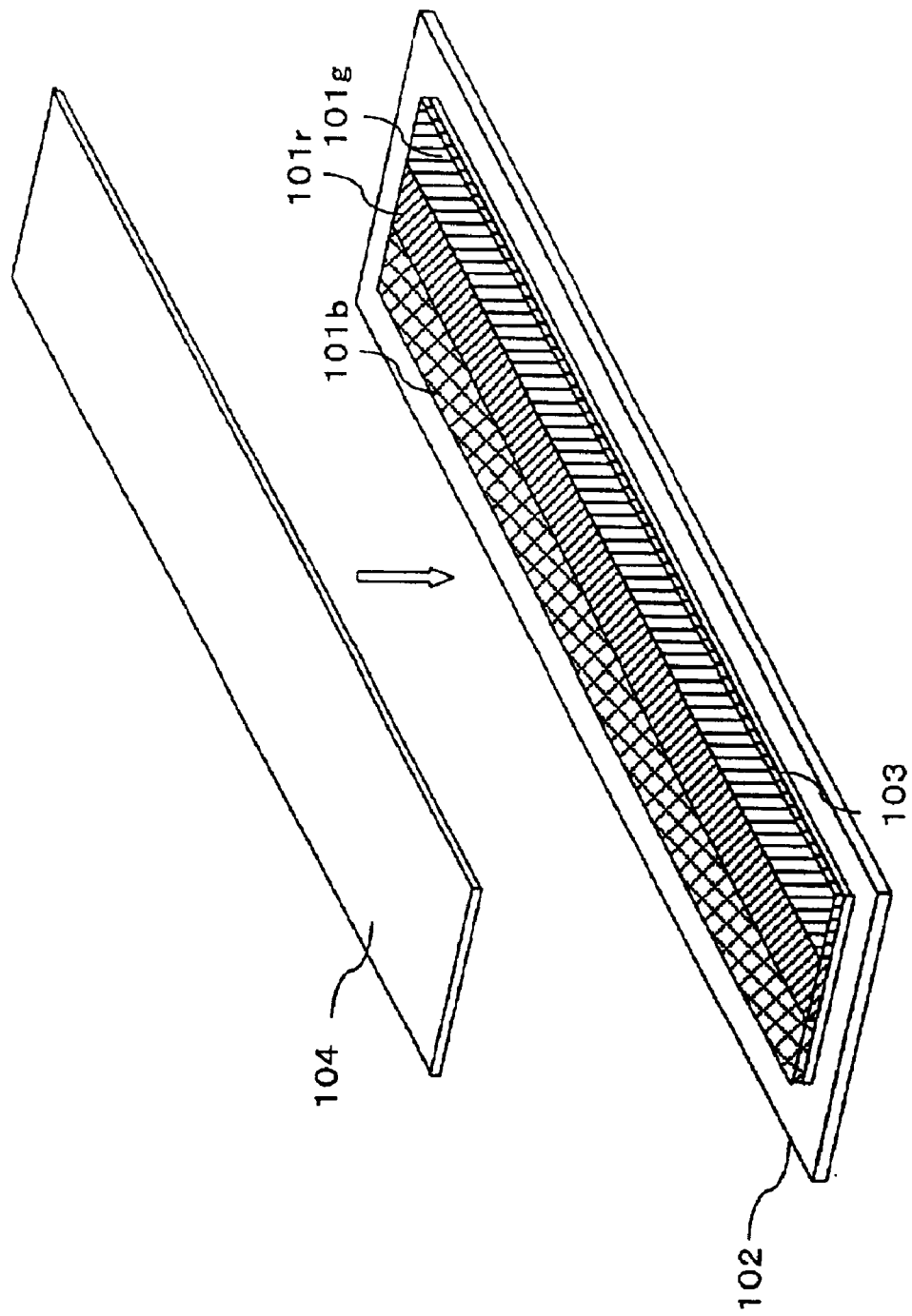
FIG. 34 is a perspective view of a prior art light source using electroluminescences of three colors R, G, B.

In an experiment, when LED array 112 (FIG. 31) was used as light sources 5a, 5b of light source unit 15 and the distance between center O of LED element 125 and reading position Pa was not larger than 7 mm, no uniform illuminance could be obtained. But when light source 5 of the present invention was used, uniform illuminance could be obtained even if the distance between center O of electoluminescence layer 11 of light sources 5a, 5b and reading position Pa was decreased to 1 mm.

In the arrangement shown in 21, the smaller the angle θ formed between segment L joining center O of the electroluminescence layer 1 of light sources 5a, 5b and reading position Pa and document face 6, the lower the illuminance on reading position Pa, and the larger the angle θ, the greater the ratio of reflected light to light entering condenser lens 14, and the image becomes unclear.

If the angle θ is 40° to 55°, the illuminance on reading position Pa is relatively high and the quantity of reflected light entering condenser lens 14 is relatively small. For this reason, if light sources 5a, 5b are so installed that the angle θ is 40° to 55°, the illuminance on reading position Pa and MTF (modulation transfer function) value are relatively high. The term MTF value as used herein means the resolving power of the reading sensor 8.

Therefore, in case a color light source is used as light sources 5a, 5b, it is desirable that light source 5 is so installed that the angle θ formed between segment L joining center O of the electroluminescence layers 1r, 1g, 1b and reading position Pa and document face 6 is 40° to 55°.

Color electroluminescence layer 1, that is, layer 1r requires the largest light emitting area because of the relation with illuminance on the document required for reading an image and luminescent luminance. In this case, it is especially desirable that light source 5 is so installed that the angle θ formed between segment L joining center O of red electroluminescence layer 1r and reading position Pa and document face 6 is 40° to 55°.

If light source 5 is so installed that the angle θ formed between segment L joining center O of red electroluminescence layer 1r to reading position Pa and document face 6 is 40° to 55°, it is desirable that electroluminescence layers 1g, 1b are laminated closely side by side with the electroluminescence layer 1r in the lateral direction with the electroluminescence layer 1r in the center of transparent substrate 2.

The quantity of reflected light entering fiber lens 14 depends not only on angle θ but kind of material of document.

Embodiment 9

Light sources 5 shown in FIG. 14 to FIG. 20 have missing part 40 in the jointing part of light source 50. In case light sources 5 shown in FIG. 14 to FIG. 20 are used as light sources 5a, 5b of light source unit 15, light source 5a, 5b are placed without the lateral sides aligned, for example, so that missing part 40a, 40b are not aligned as seen from the direction parallel with the lateral sides of fiber lens 14. And it is desirable that if the total length of light sources 5a, 5b is 320 mm and the length of missing parts 40a, 40b of light sources 5a, 5b is 1 mm, missing part 40a, 40b are not smaller than 2 mm apart in the longitudinal direction of condenser lens 14.

Figure 23A:
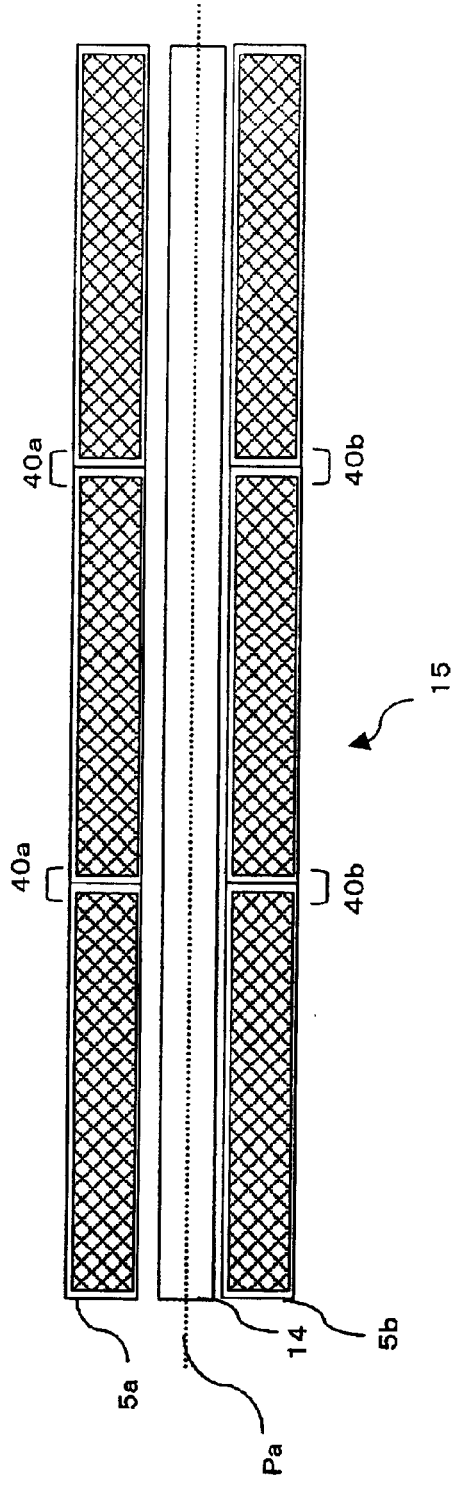
FIG. 23 is a top view of a light source unit and an illuminance distribution at the reading position.

Through such an arrangement, the drop in illuminance at reading position Pa because of missing parts 40a, 40b will be small as compared with the placing of light sources 5a, 5b so that missing parts 40a, 40b are aligned as seen from the direction parallel with the lateral side condenser lens 14 as shown in FIG. 23A.

Figure 22A:
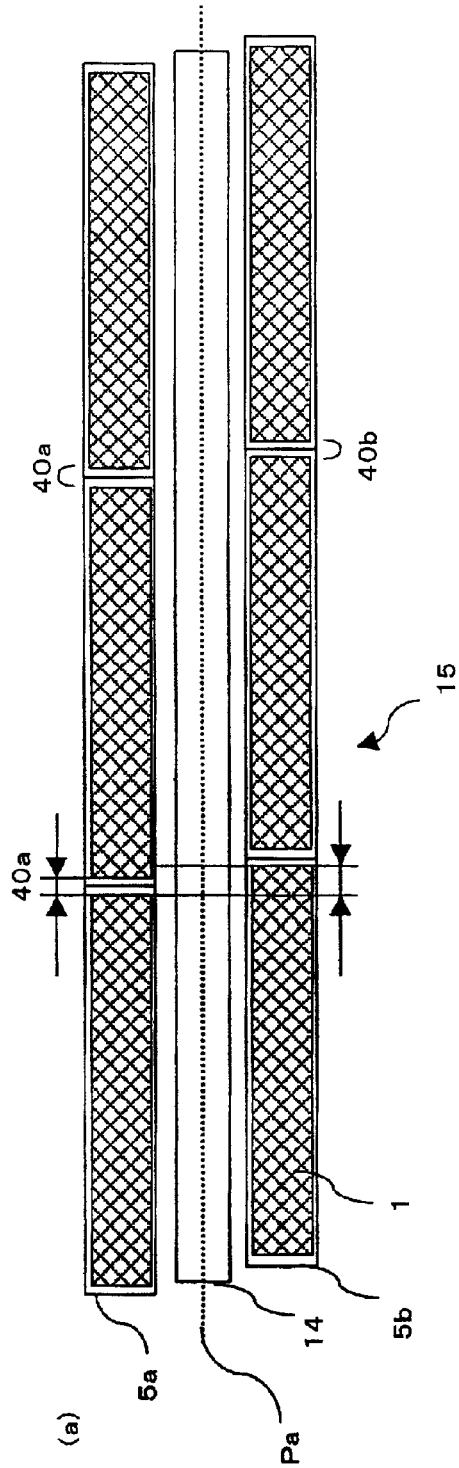
FIG. 22 is a top view of a light source unit and an illuminance distribution at the reading position.
Figure 22B:
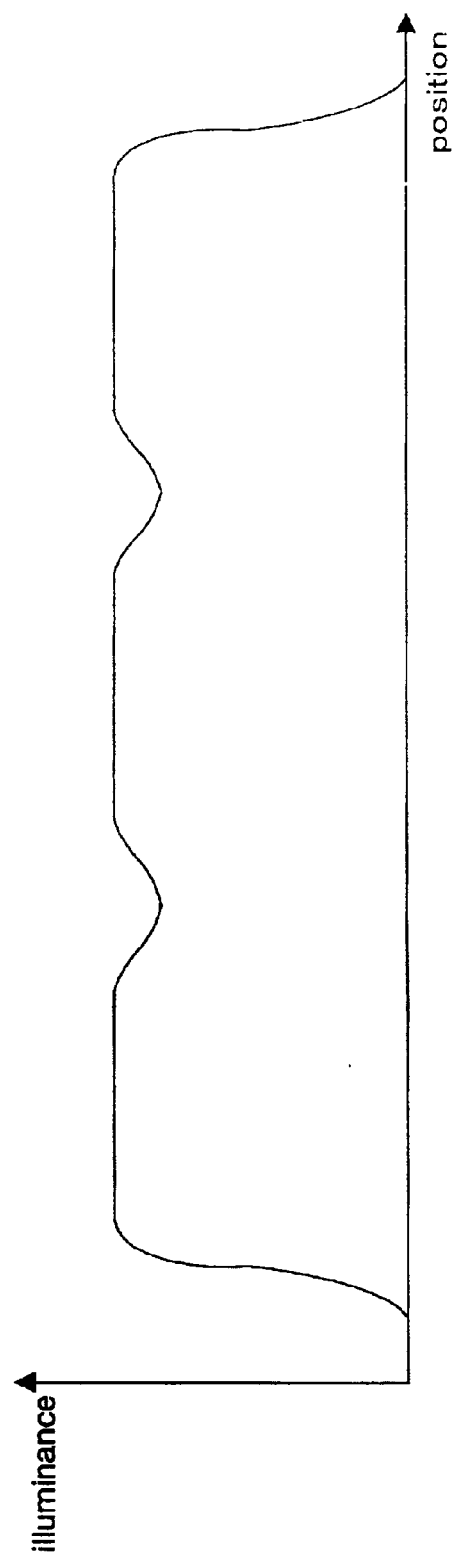
Figure 23B:
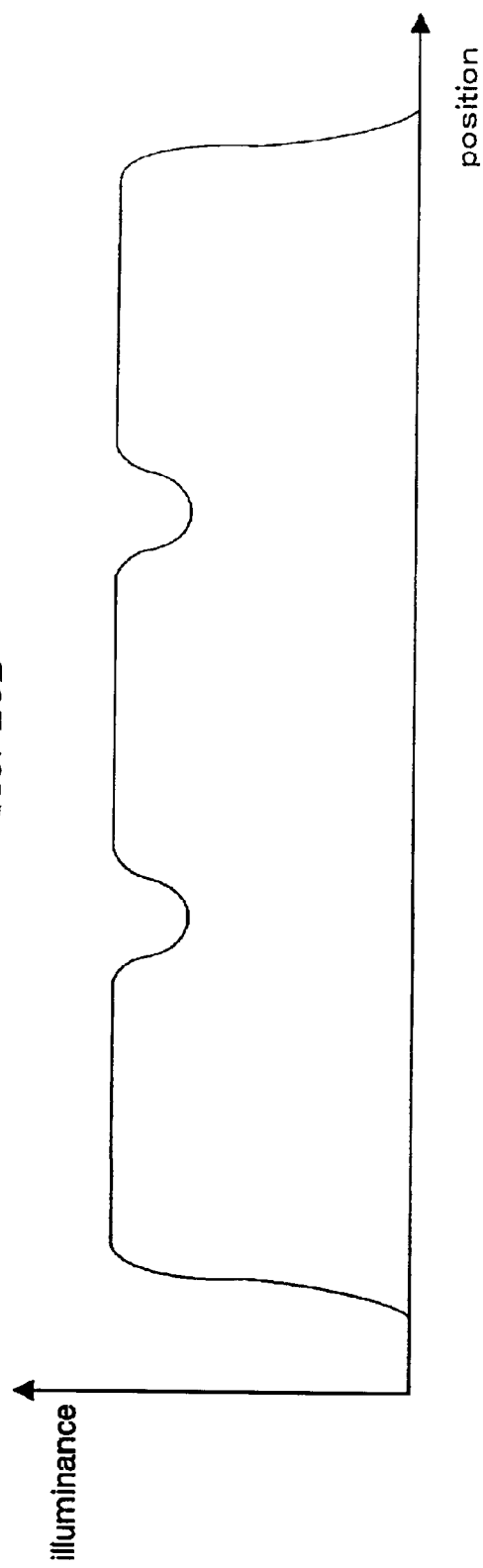

FIG. 22B, FIG. 23B show illuminance distribution at reading position Pa when light source 5 is placed as in FIG. 22A, FIG. 23A.

In addition to the staggered placing of light sources 5a, 5b, there is another other way of placing missing part 40a and missing part 40b at different positions as seen from the direction parallel with the longitudinal direction. That is, a light source piece 50 shorter than another light source piece 50 is used as light source pieces 50 at both ends of light source 5a and 5b.

Embodiment 10

In the arrangement shown in FIG. 21, to bring condenser lens 14 near to reading position Pa with the focal point of condenser lens 14 kept deep, it is necessary to reduce the diameter of the fibers making up condenser lens 14 as compared with the diameter of the prior art rod, or to increase the distance between document face 6 and sensor 8. In the prior art rod lens, the focal depth is kept deep by increasing conjugate length T, but to increase conjugate length T is a contradiction to an attempt to reduce thickness and size of the image reading apparatus.

Figure 24:
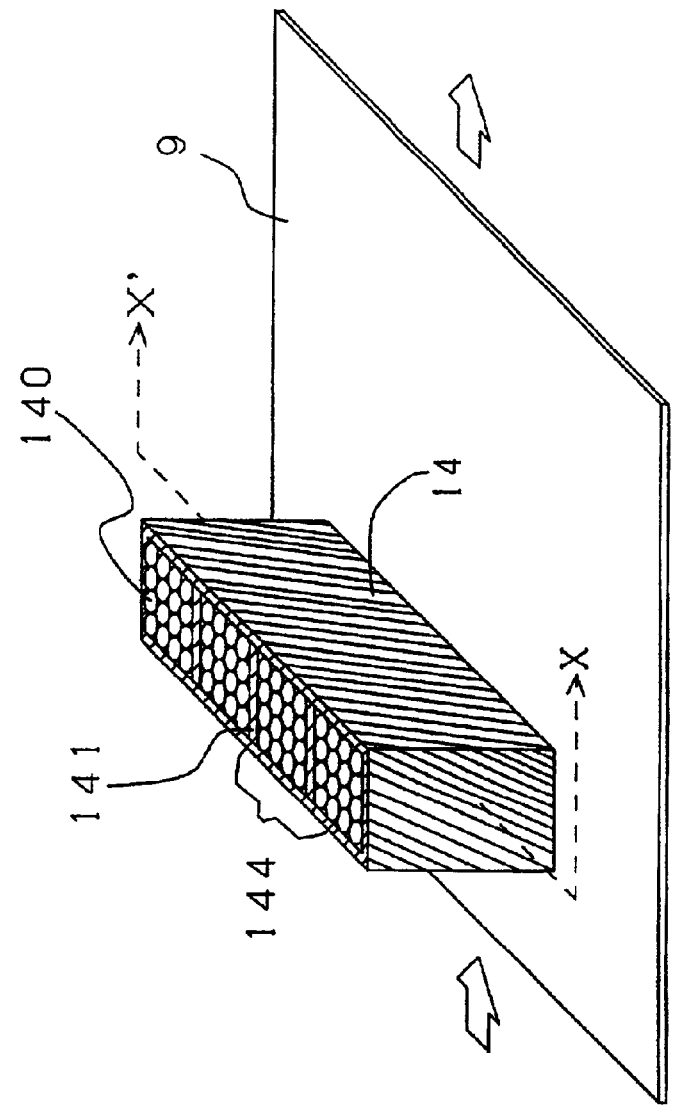
FIG. 24 is a perspective view of a fiber lens.
Figure 25:
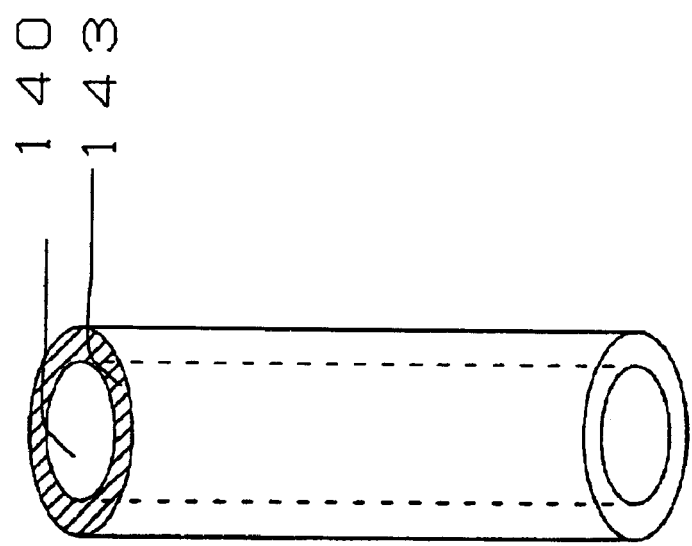
FIG. 25 is a perspective view of an optical fiber for a fiber lens.

As shown in FIG. 24, as solution to this problem, condenser lens 14 is formed of a bundle of optical fibers 140, each less not larger than 0.5 mm. That makes it possible to shorten the focal length of condenser lens 14 and to deepen the focal depth, to keep down the total length of the light passage and to reduce the thickness and size of the image reading apparatus. But that makes such phenomena as cross talk and flare conspicuous. Therefore, light absorbing layer 143 is formed around each of optical fibers 140 of a specific length as shown in FIG. 25, or a plurality of optical fibers 140 of a specific length are bundled and a light absorbing layer 141 is formed around it to make a fiber bundle 144 as shown in FIG. 24.

Figure 26:
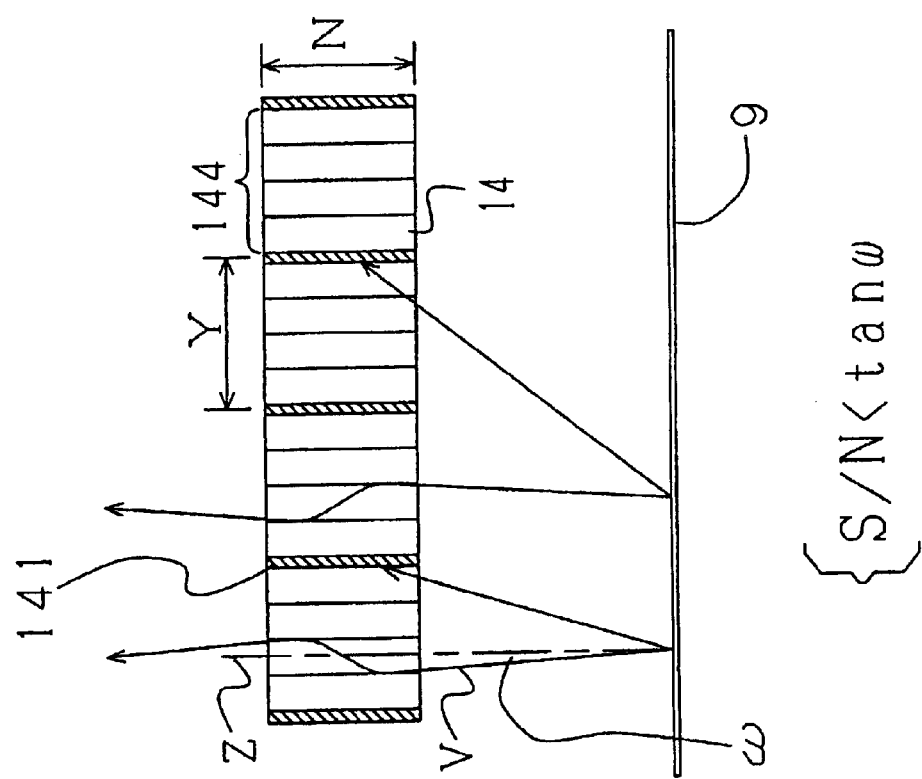
FIG. 26 is an X–X' sectional view of a fiber lens.

To prevent phenomena like cross talk and flare, the fiber bundle 144 is made to meet the following relation. That is, as shown in FIG. 26, outside diameter Y and its length N and angular aperture ω are so set that length (outside diameter) Y of one side of fiber bundle 144 by length N of optical fiber 140 is smaller than the tangent value of angular aperture ω, that is, the angle between central axis Z of the optical fiber 140 and incident light V.

Figure 27:
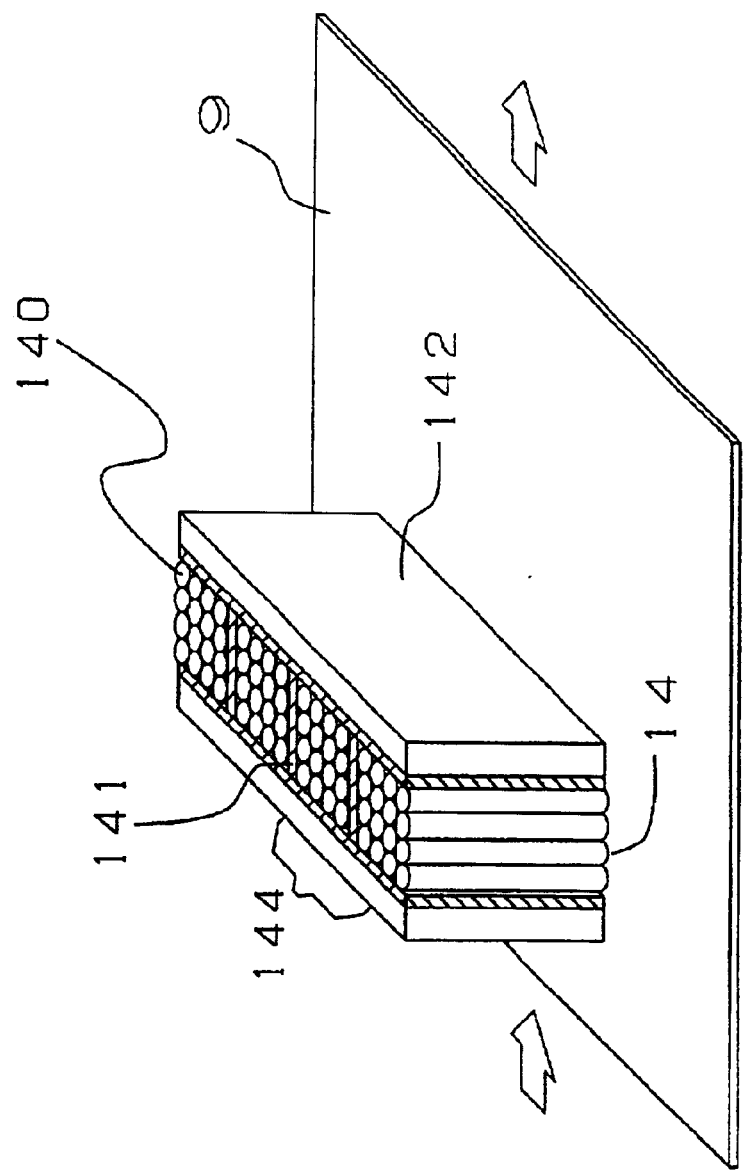
FIG. 27 is a perspective view of a fiber lens.

A plurality of individual optical fibers 140 with a light absorbing layer 143 formed like that or a plurality of fiber bundles 144 with the light absorbing layers 141 formed are placed into a frame, with the longitudinal direction in the vertical position and placed side by side until the frame is filled up, and an adhesive is filled into the gaps between the optical fibers 140 and solidified, and the frame is removed, the frame of a specific form being open on upper side and on the down side. The specific form of the frame is a form required for image reading apparatuses such as copying machine using condenser lens 14 to perform their intrinsic functions and is generally a strip perpendicular to the document carrying direction. Furthermore, as shown in FIG. 27, if necessary for molding, individual optical fibers 140 or fiber bundles 144 may be sandwiched in the frame between a substrates 142 of opaque glass, resin or the like so that the substrates 142 and the individual optical fibers 140 or fiber bundles 144 are bonded to each other.

Furthermore, there is another solidifying method. That is, a plurality of individual optical fibers 140 making up a light absorbing layer 143 or a plurality of fiber bundles 144 forming the light absorbing layer 141 are closely arranged, for example, with the longitudinal direction of optical fibers 140 placed vertically, and an adhesive filled in the gaps and sandwiched between the two substrates 142 made of opaque glass, resin etc., followed by hot pressing to solidify the adhesive (not shown).

In the optical fiber 140, the refractive index gradually decreases toward the periphery in the direction perpendicular to the axis. Without the light absorbing layers 141, 143, light converges toward the center theoretically. In practice, however, if the diameter is small, the cross talk or flare phenomenon will be conspicuous, and it is necessary to form the light absorbing layers 141, 143.

The light absorbing layers 141, 143 can be formed by coating, dipping or vapor deposition of a black resin. The adhesive filled into the frame with the individual optical fibers 140 or a fiber bundles 144 placed in it may be a conventional adhesive, but it is desirable to use an adhesive such as black adhesive that can prevent the cross talk or flare phenomenon. The adhesive becomes the light absorbing layer 141. In case an adhesive such as the black one serves as light absorbing layer at the same time, the condenser lens 14 is made in such methods in which the adhesive is formed around the individual optical fibers 140 or fiber the bundle 144 and a frame in a specific shape with the upper and down sides open or in which the material is sandwiched with the two substrates 142 and subjected to hot pressing. In making that, needless to say, it is important to see that the adhesive like black resin flows and fills the whole space surrounding the optical fibers 140 or the fiber bundles 144. Among the suitable adhesives are glass and resin with a low melting point. It is necessary that the melting point is lower than that of such materials as the optical fiber 140 making up the condenser lens 14 and the substrate 142.

Figure 28:
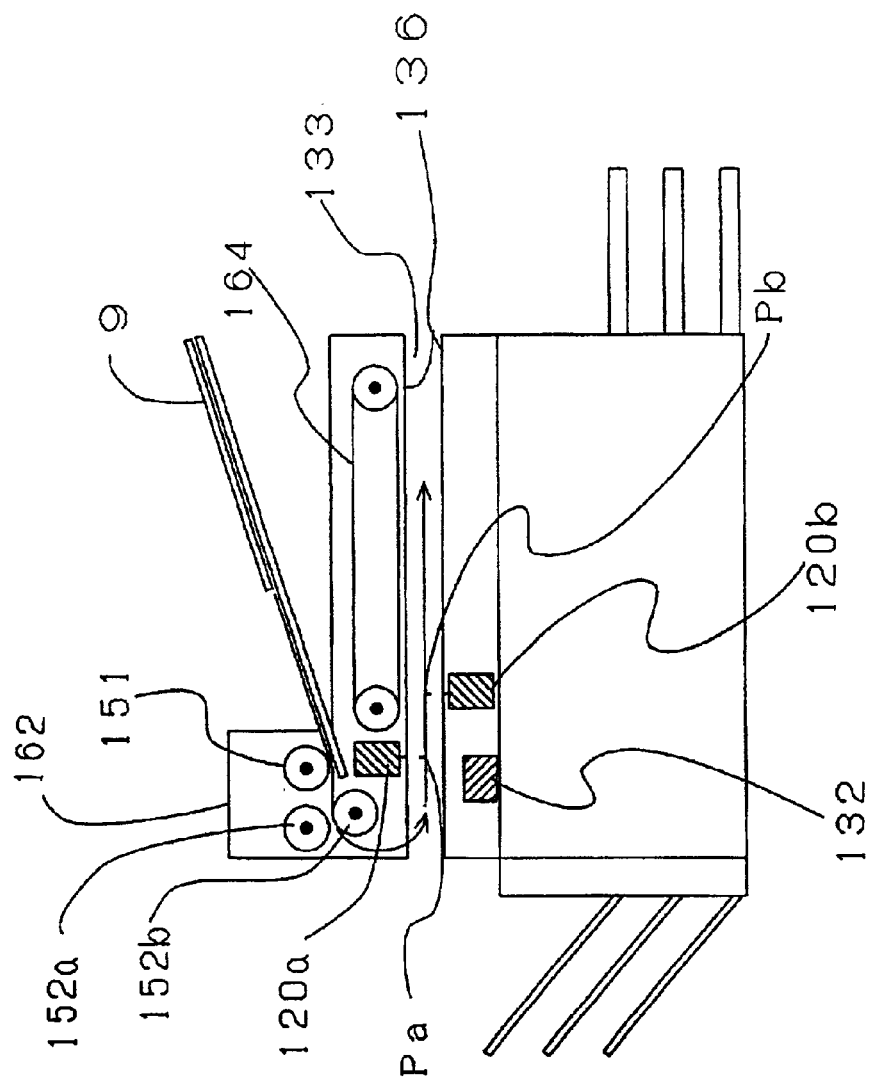
FIG. 28 is a view showing a copying machine that reads both sides.

Now, if the diameter of optical fiber 140 provided in the fiber lens 14 is about 0.1 mm—⅙ of the diameter of the prior art rod lens—and the length of the fiber lens 14 is about 4.0 mm—⅙ of the length of the rod lens—, the thickness in the direction perpendicular to document 9 in the reading apparatuses 120*a*, 120*b* shown in FIG. 28 is about 10 mm—⅙ of that of the prior art image reading apparatus of the contact type.

FIG. 28 shows an image reading apparatus to which the present invention is applied and which can read both sides of the document. Needless to say, the image reading apparatus may be used in the facsimile machine and copying machine.

As in the prior art, the document 9 fed into the unit by pickup roller 151, a member of a document transport section 162, is sent in a horizontal transport passage 133 by upper and lower feeding rollers 152*a*, 152*b*. The transport passage 133 is provided with belt roller 164 that receives the document 9 from the upper and lower feeding rollers 152*a*, 152*b* and sends it backward and is so controlled that when the first end of document 9 reaches a specific position, the image reading apparatus starts to work.

Two, that is, the upper and lower the reading apparatuses 120*a*, 120*b* are provided near the front end of the horizontal transport passage 133, and both side of the document 9 are read at upper and lower reading positions Pa, Pb while the document 9 is being carried.

In the lower reading apparatus 120*b*, a deep focal depth is required so that a document such an open book that does not come in close contact with a document table 136 can be read. If the fiber lens 14 and the light source 5 of the present invention are used in the lower reading apparatus 120*b*, the whole reading apparatus can be made thinner. Needless to say, if the fiber lens 14 shown in FIG. 24 and the light source 5 of the present invention are used as the upper and lower reading apparatuses 120*a*, 120*b*, the thickness of the image reading apparatus can be further reduced.

As mentioned above, when images on both sides of the document 9 are read, light rays from the light sources of the upper and lower reading apparatuses 120*a*, 120*b* interfere with each other if the upper and lower light sources shed light at the same position. For this reason, the reading apparatuses 120*a*, 120*b* are installed at different positions so that the light sources of the reading apparatuses 120*a*, 120*b* do not send light at the same position and the light interference can be avoided.

In addition, the reading apparatus 120*a*, 120*b* have reading characteristics such as γ value (ratio of density to sensor output) that has an effect on read information on images on both sides of document and gradation etc. It is desirable that images printed on both side of paper etc. held in the copying machine are identical in quality. For that, it is necessary that read information of quality from the upper reading apparatus 120*a* is identical with read information of quality from the lower reading apparatus 120*b* in quality. Therefore, the copying machine is provided with the reading correction means 132 so as to correct and equalize reading characteristics of the reading apparatuses 120*a*, 120*b*.

Figure 29:
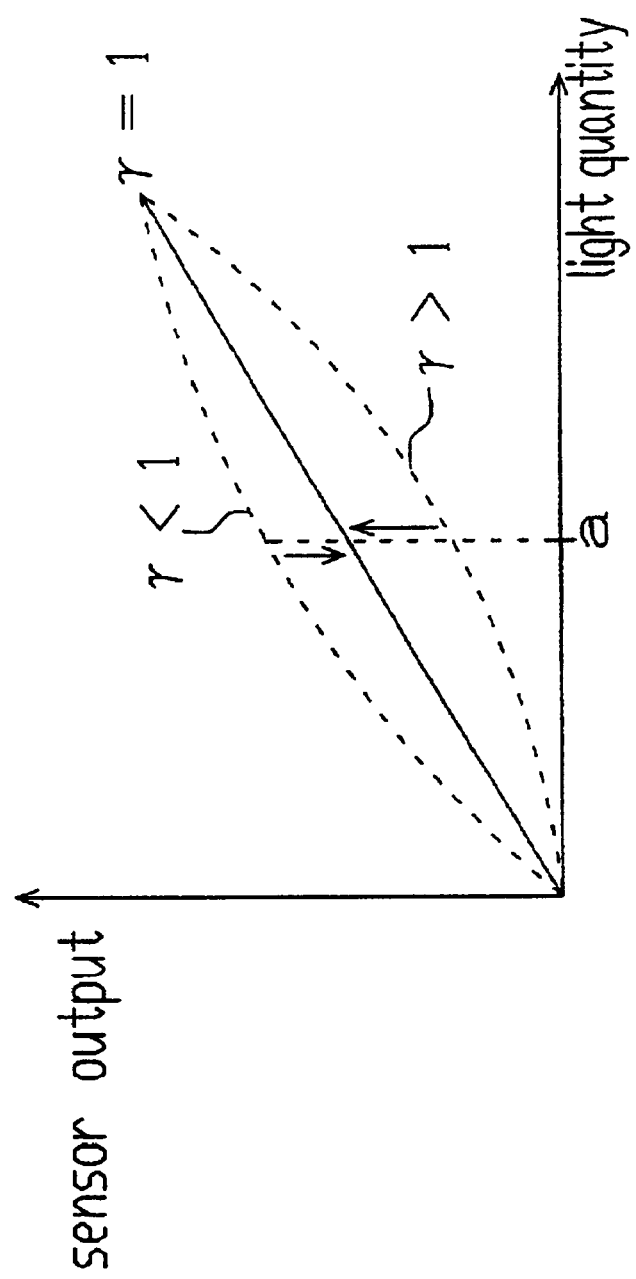
FIG. 29 is a graph showing an example of correction by y value of reading correction means.
Figure 30:
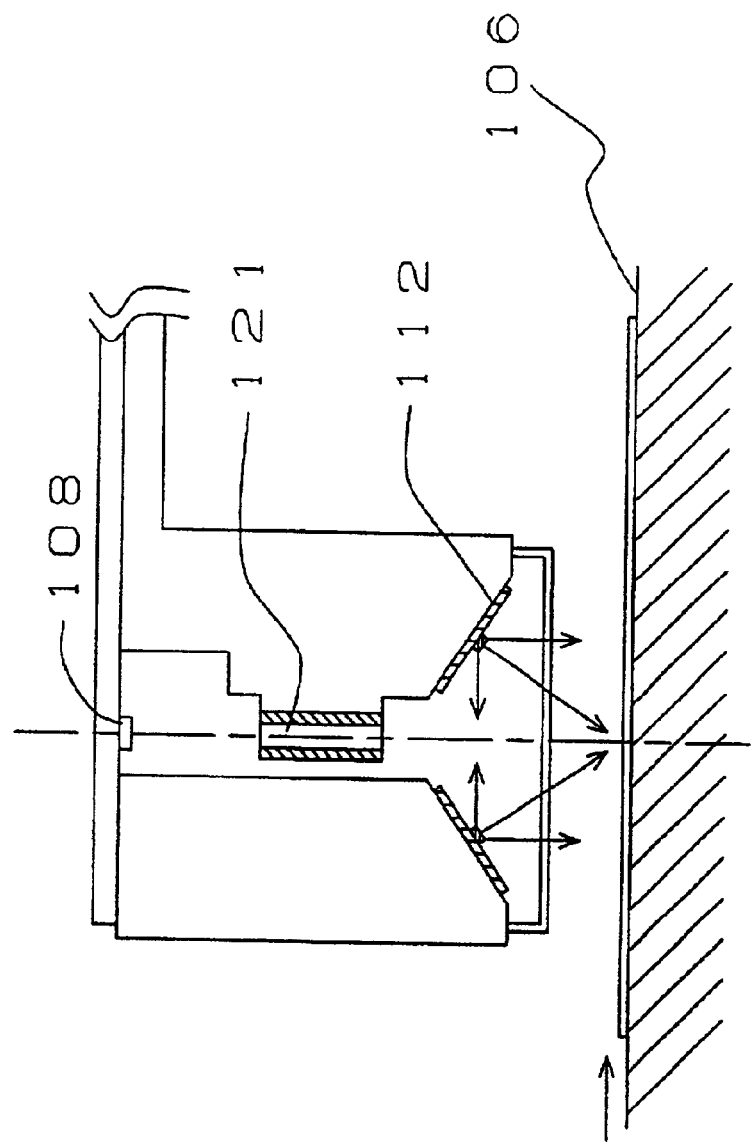
FIG. 30 is a view showing a prior art image reading apparatus of the contact type.

In the γ value, for example, the relation between the quantity (total quantity of light bundle for a specific time) of reflected light from the document 9 and the output of the sensor and γ value is expressed by a graph shown in FIG. 29 where generally γ>1 and γ=1 or γ<1. If the sensor output is increased by arbitrary light quantity value a, the γ value is corrected by the reading correction means 132 so that γ>1. Likewise, correction is made by the reading correction means 132 so that γ=1 or γ<1. That way, the quantity of light and the sensor output are adjusted to equalize read information of upper and the lower reading apparatuses 120a, 120b.

Furthermore, of the upper and lower reading apparatuses 120a, 120b provided in the copying machine, the upper reading apparatus 120a may be fixed while the lower reading apparatus 120b may be made movable. For example, the movable type using the reduction optical system (reduction CCD system) may be adopted as in the prior art.

Image reading operation in this case is carried out this way. First, the document 9 inserted in the document transport section 162 is transported to the horizontal transport passage 133 by the pickup roller 151 and the rollers 152a, 152b. Then, document 9 is sent to the horizontal transport passage 133 while being read by the reading apparatus 120a of the fixed type. Under the horizontal transport passage 133 is provided a reading table made of glass (not shown), and with the document 9 placed on the reading table, belt roller 164 stops temporarily and the light source fluorescent lamp (that is, reading position Pb) is moved. And when reading by the reading apparatus 120b is finished, the belt roller 164 moves again to discharge document 9.

As described, documents like books that can be sent to the document transport section 162 can be copied by adopting the lower reading apparatus 120b of the movable type using the reduction optical system (reduction CCD system) and at the same time adopting the same arrangement as the conventional copying machine in which the document 9 can be placed on the glass document table from above.

Needless to say, instead of moving the lower reading apparatus 120b using the reduction optical system (reduction CCD system), the fluorescent lamp may be fixed at a specific position and document 9 is read as it is carried on the belt roller 164.

In the above description, meanwhile, the image reading apparatus utilizing a light source of the present invention is applied to the copying machine. In addition, the present invention can be applied to the facsimile machine, image reading apparatus, multi-function printer etc.

What is claimed is:

1. A light source for image reading apparatuses, comprising:
    a transparent substrate;
    a transparent electrode layer laminated on the transparent substrate;
    an electroluminescence layer laminated on the transparent electrode layer, of which width varies over a distance from the contact point between the electrode layer and a lead as the function of the distance; and
    a metallic electrode layer laminated on the electroluminescence layer.

2. The light source for image reading apparatuses of claim 1 wherein the width of the electroluminescence layer is increased gradually with increase in the distance from the contact point.

3. A light source for image reading apparatuses, comprising:
    a transparent substrate;
    a transparent electrode layer laminated on the transparent substrate;
    a lead laminated on a part of a peripheral portion of the transparent electrode layer;
    an electroluminescence layer laminated on the transparent electrode layer and the lead;
    a metallic electrode layer laminated on the electroluminescence layer.

4. The light source for image reading apparatuses of claim 3 wherein the electroluminescence layer is insulated from the lead with an insulating film.

5. A light source for image reading apparatuses, comprising:
    a transparent substrate;
    a transparent electrode layer for each color of R (red), G (green), B (blue), laminated on the transparent substrate;
    an electroluminescence layer for each color of R (red), G (green), B (blue) laminated on the transparent electrode layer, of which each area covering the transparent electrode layer is set according to a light emitting capability of the respective colors and an illuminance on a document required for reading an image of the respective colors; and
    a metallic electrode layer laminated on the electroluminescence layer for each color of R (red), G (green), B (blue).

6. The light source for image reading apparatuses of claim 5 wherein the electroluminescence layer of the respective color R, G, B is formed into a strip being nearly equal in length, of which each width is set according to the light emitting capability and the illuminance, and each strip is arranged parallel along its length.

7. The light source for image reading apparatuses of claim 6 wherein the width of each strip is decreased with increase in the light emitting capability and increased with increase in the illuminance.

8. The light source for image reading apparatuses of claim 7 wherein the widest strip is arranged between two other strips.

9. The light source for image reading apparatuses of claim 7 or 8 wherein a smaller angle formed between a document face and a normal line to a surface of the widest strip is 40 to 55 degrees.

10. A light source for image reading apparatuses, comprising:
    a transparent substrate;
    a transparent electrode layer for each color of R (red), G (green), B (blue), laminated on the transparent substrate;
    an electroluminescence layer for each color of R (red), G (green), B (blue) laminated on the transparent electrode layer, of which each position is set according to a light emitting capability of the respective colors and an illuminance on a document required for reading an image of the respective colors; and
    a metallic electrode layer laminated on the electroluminescence layer for each color of R (red), G (green), B (blue).

11. The light source for image reading apparatuses of claim 10 wherein a smaller angle formed between a document face and a normal line to a surface of the electroluminescence layer which has the lowest light emitting capability is 40 to 50 degrees.

12. The light source for image reading apparatuses of claim 5 or 10 wherein a common transparent electrode layer is used in place of each transparent electrode layer corresponding to R (red), G (green), B (blue), laminated on the transparent substrate, or a common metallic electrode layer is used in place of each metallic electrode layer corresponding to R (red), G (green), B (blue).

13. A light source for image reading apparatuses, comprising;

a plurality of light source pieces wherein each source piece has a light emitting layer on a transparent substrate;

a plurality of joint portions jointing each light source piece to provide one light source, wherein the width at the end of the light emitting layer of each of the light source pieces is larger than the width in the center.

14. A light source for image reading apparatuses, comprising;

a plurality of light source pieces wherein each source piece has a light emitting layer on a transparent substrate;

a plurality of joint portions jointing each light source piece to provide one light source, wherein the end face of the lateral side of the light source pieces is slanted in relation to the lateral direction of the light source pieces.

15. A light source for image reading apparatuses, comprising;

a plurality of light source pieces wherein each source piece has a light emitting layer on a transparent substrate;

a plurality of joint portions jointing each light source piece to provide one light source, wherein the light emitting layer of each of the light source pieces is made up of a central light emitting layer making the center of the light emitting layer emit light and end light emitting layers making the ends of the light emitting layer emit light, and wherein the end faces of the light source piece are roughly L-shaped.

16. The light source for image reading apparatuses of claim 15 wherein the end face is off the median line parallel with the longitudinal direction of the light source piece.

17. An image reading apparatus, comprising:

a light source;

the light source further comprising;

a transparent substrate;

a transparent electrode layer laminated on the transparent substrate;

an electroluminescence layer laminated on the transparent electrode layer, of which width varies over a distance from the contact point between the electrode layer and a lead as the function of the distance; and a metallic electrode layer laminated on the electroluminescence layer.

18. The image reading apparatus of claim 17 wherein the width of the electroluminescence layer is increased gradually with increase in the distance from the contact point.

19. An image reading apparatus, comprising:

a light source;

the light source further comprising;

a transparent substrate;

a transparent electrode layer laminated on the transparent substrate;

a lead laminated on a part of a peripheral portion of the transparent electrode layer;

an electroluminescence layer laminated on the transparent electrode layer and the lead;

a metallic electrode layer laminated on the electroluminescence layer.

20. The light source for image reading apparatuses of claim 19 wherein the electroluminescence layer is insulated from the lead with an insulating film.

21. An image reading apparatus, comprising:

a light source;

the light source further comprising;

a transparent substrate;

a transparent electrode layer for each color of R (red), G (green), B (blue), laminated on the transparent substrate;

an electroluminescence layer for each color of R (red), G (green), B (blue) laminated on the transparent electrode layer, of which each area covering the transparent electrode layer is set according to a light emitting capability of the respective colors and an illuminance on a document required for reading an image of the respective colors; and a metallic electrode layer laminated on the electroluminescence layer for each R (red), G (green), B (blue).

22. The image reading apparatus of claim 21 wherein the electroluminescence layer for the respective colors R, G, B is formed into a strip being nearly equal in length, of which each width is set according to the light emitting capability and the illuminance, and each strip is arranged parallel along its length.

23. The image reading apparatus of claim 22 wherein the width of each strip is decreased with increase in the light emitting capability and increased with increase in the illuminance.

24. The image reading apparatus of claim 23 wherein the widest strip is arranged between two other strips.

25. The image reading apparatus of claim 23 or 24 wherein a smaller angle formed between a document face and a normal line to a surface of the widest strip is 40 to 55 degrees.

26. An image reading apparatus, comprising:

a light source;

the light source further comprising;

a transparent electrode layer for each color of R (red), G (green), B (blue), laminated on the transparent substrate;

an electroluminescence layer for each color of R (red), G (green), B (blue) laminated on the transparent electrode layer, of which each position is set according to a light emitting capability of the respective colors and an illuminance on a document required for reading an image of the respective colors; and a metallic electrode layer laminated on the electroluminescence layer for each color of R (red), G (green), B (blue).

27. The image reading apparatus of claim 26 wherein a smaller angle formed between a document face and a normal line to a surface of the electroluminescence layer which has the lowest light emitting capability is 40 to 50 degrees.

28. An image reaciing apparatus, comprising:

a light source;

the light source further comprising;

a plurality of light source pieces wherein each source piece has a light emitting layer on a transparent substrate;

a plurality of joint portions jointing each light source piece to provide one light source, wherein the width of the end of the light emitting layer of each of the light source pieces is larger than the width in the center.

29. An image reading apparatus, comprising:

a light source;

the light source further comprising;

a plurality of light source pieces wherein each source piece has a light emitting layer on a transparent substrate;

a plurality of joint portions jointing each light source piece to provide one light source, wherein the end face of the lateral side of the light source is slanted in relation to the lateral direction of the light source.

30. An image reading apparatus, comprising:
a light source;
the light source further comprising;
  a plurality of light source pieces wherein each source piece has a light emitting layer on a transparent substrate;
  a plurality of joint portions jointing each light source piece to provide one light source, wherein the light emitting layer of each of the light source pieces is made up of a central light emitting layer making the center of the light emitting layer emit light and end light emitting layers making the ends of the light emitting layer emit light, and wherein the end faces of the light source piece are roughly L-shaped.

31. The apparatus of claim 30 wherein the end face is off the median line parallel with the longitudinal direction of the light source piece.

32. An image reading apparatus, comprising:
a lens for reading an original document image;
two electroluminescence light sources formed by jointing a plurality of light source pieces, arranged at the right and left of the lens, and joint portions of the respective light source pieces installed at right and left are formed at different positions in the longitudinal direction of the lens.

33. A light source for image reading apparatuses, comprising:
  a transparent substrate;
  a transparent electrode layer laminated on the transparent substrate;
  an electroluminescence layer laminated on the transparent electrode layer, of which thickness is reduced gradually with increase in a distance from the contact point between the electrode layer and a lead; and
  a metallic electrode layer laminated on the electroluminescence layer.

34. An image reading apparatus, comprising:
a light source;
the light source further comprising:
  a transparent electrode layer laminated on the transparent substrate;
  an electroluminescence layer laminated on the transparent electrode layer, of which thickness reduced gradually with increase in a distance from the contact point between the electrode layer and a lead; and
  a metallic layer laminated on the electroluminescence layer.

* * * * *